US006264021B1

(12) United States Patent
Button et al.

(10) Patent No.: US 6,264,021 B1
(45) Date of Patent: Jul. 24, 2001

(54) HIGH SPEED ENVELOPE PACKING APPARATUS

(75) Inventors: Kevin Button, Vail; James Bigger, Tucson; Douglas McLean, Tucson; John Corradini, Tucson, all of AZ (US)

(73) Assignee: Bell & Howell Mail & Messaging Technologies Company, Durham, NC (US)

( * ) Notice: Subject to any disclaimer, the term of this patent is extended or adjusted under 35 U.S.C. 154(b) by 0 days.

(21) Appl. No.: 09/368,940

(22) Filed: Aug. 5, 1999

Related U.S. Application Data

(60) Continuation-in-part of application No. 08/734,632, filed on Oct. 21, 1996, now Pat. No. 5,809,749, which is a division of application No. 09/108,655, filed on Jul. 1, 1998, now Pat. No. 6,199,348.

(51) Int. Cl.[7] .................................................... B65G 47/26

(52) U.S. Cl. ................................ 198/457.02; 198/370.09

(58) Field of Search .................................... 198/597, 604, 198/613, 605, 370.1, 370.09, 457.02

(56) References Cited

U.S. PATENT DOCUMENTS 3,680,677 * 8/1972 Branch et al. .................. 198/370.09
3,782,527 * 1/1974 Petershack ...................... 198/370.09

FOREIGN PATENT DOCUMENTS

2429281 * 7/1975 (DE) ............................... 198/370.09
2427810 * 12/1975 (DE) .................................... 198/547
2042887 * 9/1978 (DE) ............................... 198/457.02
2748434 * 5/1979 (DE) ............................... 198/370.09

* cited by examiner

*Primary Examiner*—James R. Bidwell
(74) *Attorney, Agent, or Firm*—Patula & Associates, P.C.

(57) ABSTRACT

An apparatus for high speed packing of envelopes is disclosed. The apparatus includes an envelope flap opening assembly which facilitates the opening of each envelope by a finger of an opening element as the envelope passes through packing apparatus. Each envelope may then be conveyed into a first staging assembly where the envelope is stopped, allowing a freely rotating conveyor to force the envelope into contact with an ejection conveyor to direct the envelope from the first staging assembly. The envelope is then transported to the packing assembly by an intermediate conveyor having a plurality of distinctly and selectively driven conveyors to allow staging of the envelopes along the intermediate conveyor. A quick and efficient envelope packing assembly then packs the envelopes and ejects the envelope to an exiting conveyor which seals each packed envelope.

6 Claims, 23 Drawing Sheets

HIGH SPEED ENVELOPE PACKING APPARATUS

This application is a Continuation-In-Part Application of U.S. patent application Ser. No. 08/734,632, filed Oct. 21, 1996, U.S. Pat. No. 5,809,749, which is a divisional application of application Ser. No. 09/108,655 filed on Jul. 1, 1998, U.S. Pat. No. 6,199,348.

BACKGROUND OF THE INVENTION

1. Field of the Invention

The instant invention relates generally to an apparatus for the rapid packing of envelopes. The instant invention provides a novel apparatus for the packing of envelopes which increases the rate at which envelopes may be packed. More specifically, the instant invention provides for an apparatus which reduces the number of operations required to pack each envelope and which also performs each operation more efficiently than previous configurations in order to increase speed. Furthermore, buffer zones are created between operations such that each operation need not be synchronized with the others thereby allowing the removal of defective envelopes from the apparatus and without interrupting a smooth continuous flow of envelopes to the subsequent operation. The packing rate of the instant apparatus is thereby increased.

2. Description of the Related Art

Prior attempts to create an envelope packing apparatus have employed complicated systems of rotating fingers, arms, pivoting packing plates and rollers. These complicated systems result in an excessive number of moving parts which raise the cost of construction and maintenance. More importantly, these complicated systems also lower the packing rate by employing unnecessary steps and creating pauses in the packing process.

A recent attempt at a high speed envelope packing apparatus which presents deficiencies typical of the prior art can be seen in U.S. Pat. No. 5,251,425 issued to Kern ('425 patent). The feeding assembly of the '425 patent employs a rotating opening element which must open the envelope flap prior to a conveyor element having an opportunity to remove that envelope such that a delay in feeding each envelope is experienced. Furthermore, because each operation is synchronized to the others, the delays in feeding time, as well as other operations, are perpetuated throughout the packing process and thereby cause a lower packing rate. Also, the '425 patent packing trap must move up and down in coordination with a hold down roller to accomplish packing of each envelope thereby slowing the packing operation. Lastly, the '425 apparatus lacks a defect detection system or any manner of dealing with defective envelopes.

Another attempt at an envelope packing apparatus can be seen in U.S. Pat. No. 4,649,691 to Buckholz ('691 patent). The '691 patent uses complicated clamping systems to hold each envelope and stuffing material during transport. Furthermore, the timing of these clamps must be carefully calibrated to ensure proper movement of the envelopes and stuffing. Like the '425 patent, the '691 patent presents a synchronous operation such that delays of any single operation are perpetuated throughout the entire apparatus and cumulated with delays of other operations. The packing assembly of the '691 patent also presents numerous changes of direction in the envelope path creating pauses and delays. Lastly, the '691 patent provides no detection and rejection assembly to remove unopened envelopes from the apparatus.

Another attempt at an envelope packing apparatus can be seen in U.S. Pat. No. 3,872,649 to Wimmer ('649 patent). The '649 patent presents only a packing apparatus without the advantage of the novel and efficient feeding assembly, defect detection means, buffer stacks and exiting conveyor of the instant invention. Furthermore, the packing apparatus of the '649 patent comprises a complex assembly of cams rollers and intermittently swinging arms which prevent the smooth and efficient operation of the instant packing assembly.

Another attempt at an envelope packing apparatus can be seen in U.S. Pat. No. 3,423,900 to Orsinger ('900 patent). Like the '691 apparatus, the '900 patent requires rotating wheels which must grab each envelope or packing material. This requires complicated coordination and excess moving parts. Furthermore, the '900 patent provides a synchronous machine such that inefficiencies are perpetuated and accumulated throughout the apparatus. The packing assembly requires a moving packing plate, a rotating envelope delivery wheel and two conveyors to insert the packing material into each envelope. Here again the problems of proper synchronization as well as the excess of moving parts present inefficiencies and higher costs of operation and maintenance.

Another attempt at an envelope packing apparatus can be seen in U.S. Pat. No. 3,253,384 to Huck et al. ('384 patent). The '384 patent requires a rotating suction head which must be coordinated with the opening of each envelope and the conveying wheel which then grasps the envelope from the rotating suction head. Thereafter, the '384 patent comprises a complex system of clamps, swinging arms and numerous changes of direction for the envelopes, all of which create losses of time in the packing apparatus. Furthermore, they create higher costs of operation and maintenance.

Another attempt at an envelope packing apparatus can be seen in U.S. Pat. No. 2,915,863 to Kummer (1863 patent). The '863 apparatus presents similar problems of timing due to wheels and clamps employed to move envelopes, as well as pauses due to change of direction of the envelope and packing material. The '863 patent presents further inefficiency in the packing assembly due to the pivoting required by the packing plate to remove stuffed envelopes and the resulting delay experienced between stuffing of envelopes.

Another attempt at an envelope packing apparatus can be seen in U.S. Pat. No. 1,668,761 to Coty et al. ('761 patent). The '761 patent presents a bag feeding apparatus which requires two distinct operations performed in series to open a bag and remove the bag from the reserve. Furthermore, as with the previously mentioned patents, the '761 apparatus comprises a complicated system of wheels and arms which must be properly timed thereby creating higher cost of operation and maintenance.

Another attempt at an envelope packing apparatus can be seen in U.S. Pat. No. 1,543,842 to Gwinn et al. ('842 patent). The '842 patent provides a vacuum feeding assembly comprising a moving suction head which must be driven from the envelope reserve to the packing area. Furthermore, each stuffed envelope must be removed from the packing plate prior to the suction head having clearance to return to the envelope reserve to grasp another envelope.

Another attempt at an envelope packing apparatus can be seen in U.S. Pat. No. Re. 24,459 to Kern which resembles the '863 patent and presents the same inefficiencies experienced therein.

It is therefore an object of the instant invention to provide a high speed envelope packing apparatus.

It is a further object of the instant invention to provide a high speed envelope feeding assembly which does not jeopardize the integrity of the envelopes.

It is a further object of the instant invention to provide a high speed envelope packing apparatus with a minimum number of moving parts.

It is a further object of the instant invention to provide a high speed envelope packing apparatus which performs a minimum number of operations on each envelope.

It is a further object of the instant invention to provide a high speed envelope packing apparatus which eliminates the need to synchronize operation of the envelope packing assembly to the envelope feeding assembly.

It is a further object of the instant invention to provide a high speed envelope packing apparatus which comprises a monitoring system to identify and remove defects.

SUMMARY OF THE INVENTION

The above and other objects of the instant invention are accomplished by providing an envelope packing apparatus which employs a simple envelope feeding assembly which minimizes delays in feeding envelopes, a defect detection and rejection means to remove defective envelopes from the apparatus prior to reaching the packing assembly, a simple and quick envelope packing assembly and a buffer stack of envelopes between the feeding assembly and packing assembly. The deficiencies of the prior art envelope feeding assemblies are overcome in the instant invention by forcing open the flap of each envelope in the envelope reserve by means of directing forced air onto said flap while the previous envelope is still in the process of being fed from the envelope reserve. The reserve envelopes rest in an upright position wherein the flap extends downward from the top of the envelope in a flap-closed position. The reserve envelopes are further orientated such that the flap of each envelope will extend to the exposed side of that envelope when it becomes the foremost envelope in the envelope reserve. A feeding conveyor means rests in contact with a lower portion of the foremost reserve envelope in the envelope reserve such that it does not contact the flap extending from the top of that envelope. Air pressure is continually exerted on the envelope reserve means in a manner such that the flap of a second in line envelope is blown to a flap-opened position the moment the foremost envelope has been fed downward and cleared the flap of that second in line envelope. In this manner, the flap of each envelope is opened before it is available to be fed from the envelope reserve. Therefore, the time required to open each envelope flap is not a factor in the overall processing time of an envelope. Other configurations of this concept are also disclosed hereinafter.

A sensor then checks each envelope to insure that the flap has opened. Envelopes which have not opened are detected and diverted from the stream of envelopes at that point. The remaining envelopes continue onward to a buffer stack of envelopes and then to the packing apparatus. The buffer stack of envelopes allows the packing apparatus to operate independently of the output from the feeding assembly or the defect detection and rejection means. Consequently, the packing assembly need not be synchronized to the feeding assembly. Furthermore, by making the feed rate dependant upon the number of envelopes in the buffer stack, the feeding assembly can speed up to replenish envelopes ejected from the system by the defect detection and rejection means. Therefore, a smooth, continuous flow of properly opened envelopes is delivered to the packing assembly.

The deficiencies of the prior art envelope packing assembly are overcome by employing a stationary packing trap and a threading roller connected to a laterally adjacent exiting platform. The exiting platform shifts downward to allow an envelope to be staged above the threading roller and then shifts upward so that the threading roller advances the envelope such that the envelope is placed around the packing plate. The exiting platform then shifts back downward to stage another envelope while the envelope on the packing plate is packed and removed onto the top of the exiting platform. The, difficulties typically experienced in coordinating the feeding process with the packing process are overcome by positioning the buffer stack of envelopes between the feeding assembly and the packing assembly.

Lastly, as each envelope leaves the exiting platform, it is dropped into a transfer unit which ejects the envelope to a stand-up subassembly to reorient each envelope to a vertical position. The glue of each envelope is then moistened by a reservoir such that when the adjacent contorted belt guides the envelope flap into contact with the envelope body, a sealed envelope is accomplished.

The instant envelope packing apparatus has a minimum of moving parts. Because the moving parts employed in the instant invention are mostly small rollers and belts employed to deliver envelopes from one operation to another the process may be accomplished at high speeds. The delays experienced by prior art envelope packing configurations are eliminated by the instant apparatus, in part, because the pivoting packing plates, large rollers, wheels, swinging arms, cams and numerous redirections of the envelopes are not employed.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein.

DETAILED DESCRIPTION OF THE PREFERRED EMBODIMENT

Figure 1:
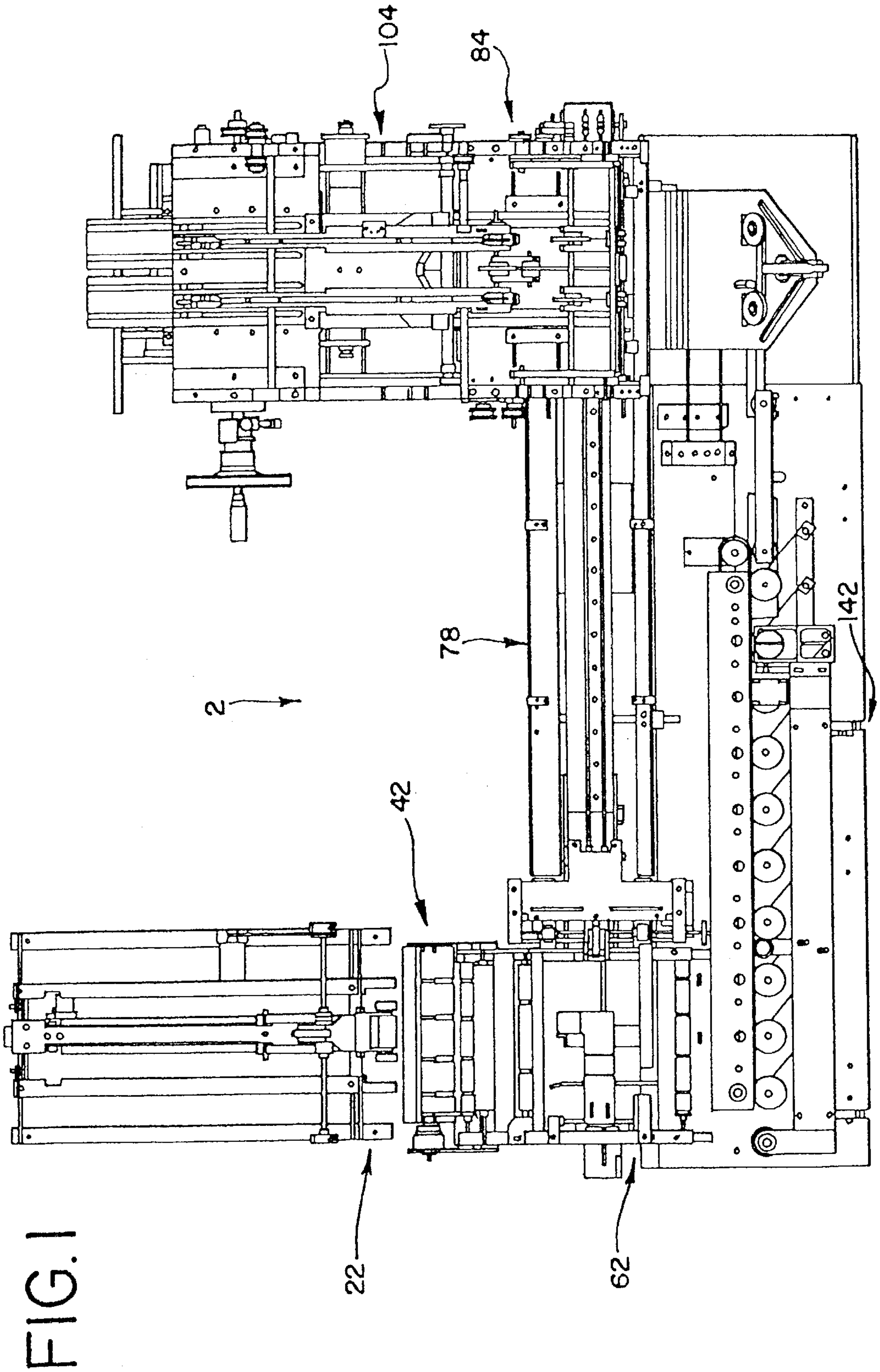
FIG. 1 is a substantially schematic top view of the envelope packing apparatus of the instant invention.

While the invention is susceptible of embodiment in many different forms there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

Referring to the drawings wherein identical reference numerals denote the same elements throughout the various views, the present invention is accomplished in a preferred embodiment by the envelope packing apparatus 2 of FIG. 1. The envelopes for which the instant invention is configured to pack originate at an envelope feeding assembly 22 where the envelopes are opened, fed through a defect detection assembly 42 and into a first bottom feeder 62. From the first bottom feeder, each envelope is fed to an intermediate conveyor 78 which transports each respective envelope from the first bottom feeder 62 to a second bottom feeder 84 (not visible in FIG. 1) from which an envelope packing assembly 104 draws envelopes. Each envelope is packed with the desired materials at the envelope packing assembly 104 and exited to exiting conveyor 142. Exiting conveyor 142 then seals each packed envelope and transports them out of the apparatus.

Figure 2:
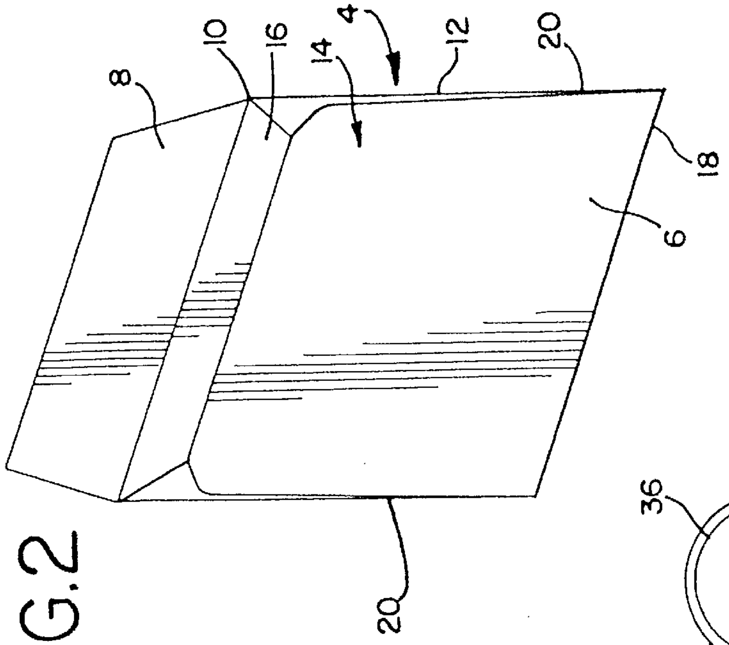
FIG. 2 is a substantially schematic perspective view of an envelope of a type which may be used with the instant invention.

A typical envelope 4 (depicted in FIG. 2) of the type used in the instant envelope packing apparatus 2 comprises an envelope body 6 and a flap 8. The flap 8 is connected to the body 6 at a connecting edge 10 thereof. The envelope body 6 comprises an envelope front wall 12 and an envelope back wall 14. The envelope front wall 12 and back wall 14 are connected at three sides but left unconnected at the side adjacent the connecting edge 10 to form an envelope opening 16. The connected side opposite the envelope opening 16 is an envelope bottom 18 and the two other connected sides are envelope sides 20.

Figure 3A:
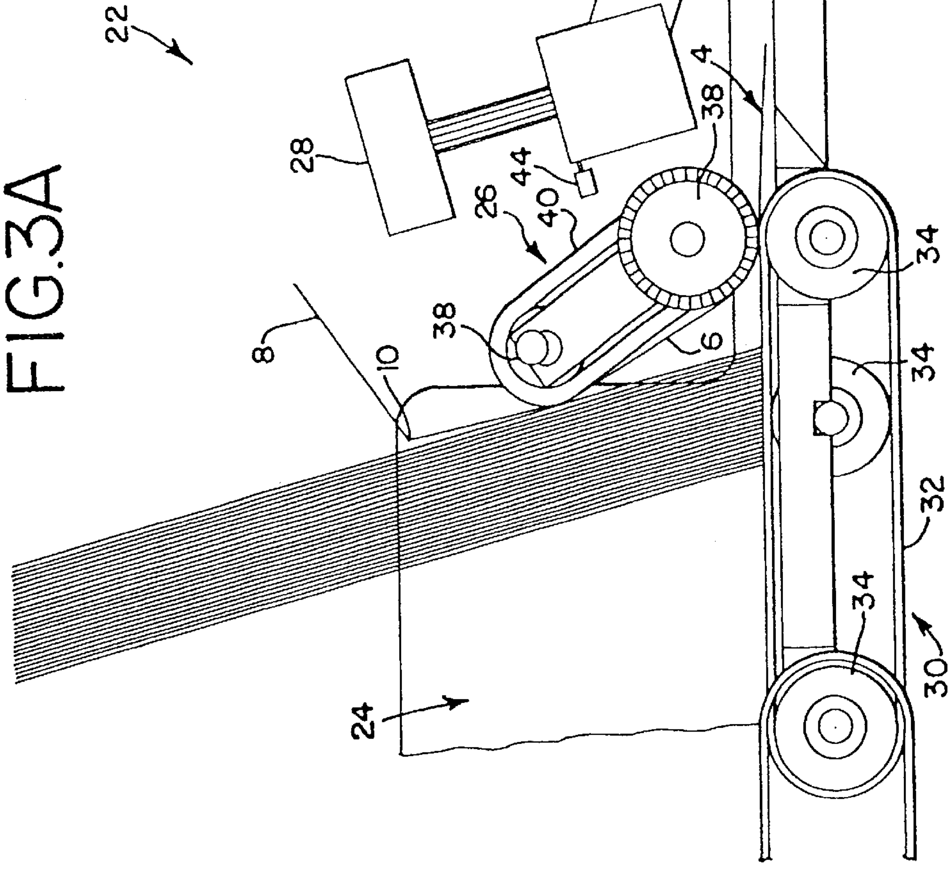
FIG. 3A is a substantially schematic cross-sectional view of the feeding assembly and the sensor of the defect detection and rejection means of the instant invention.
Figure 3B:
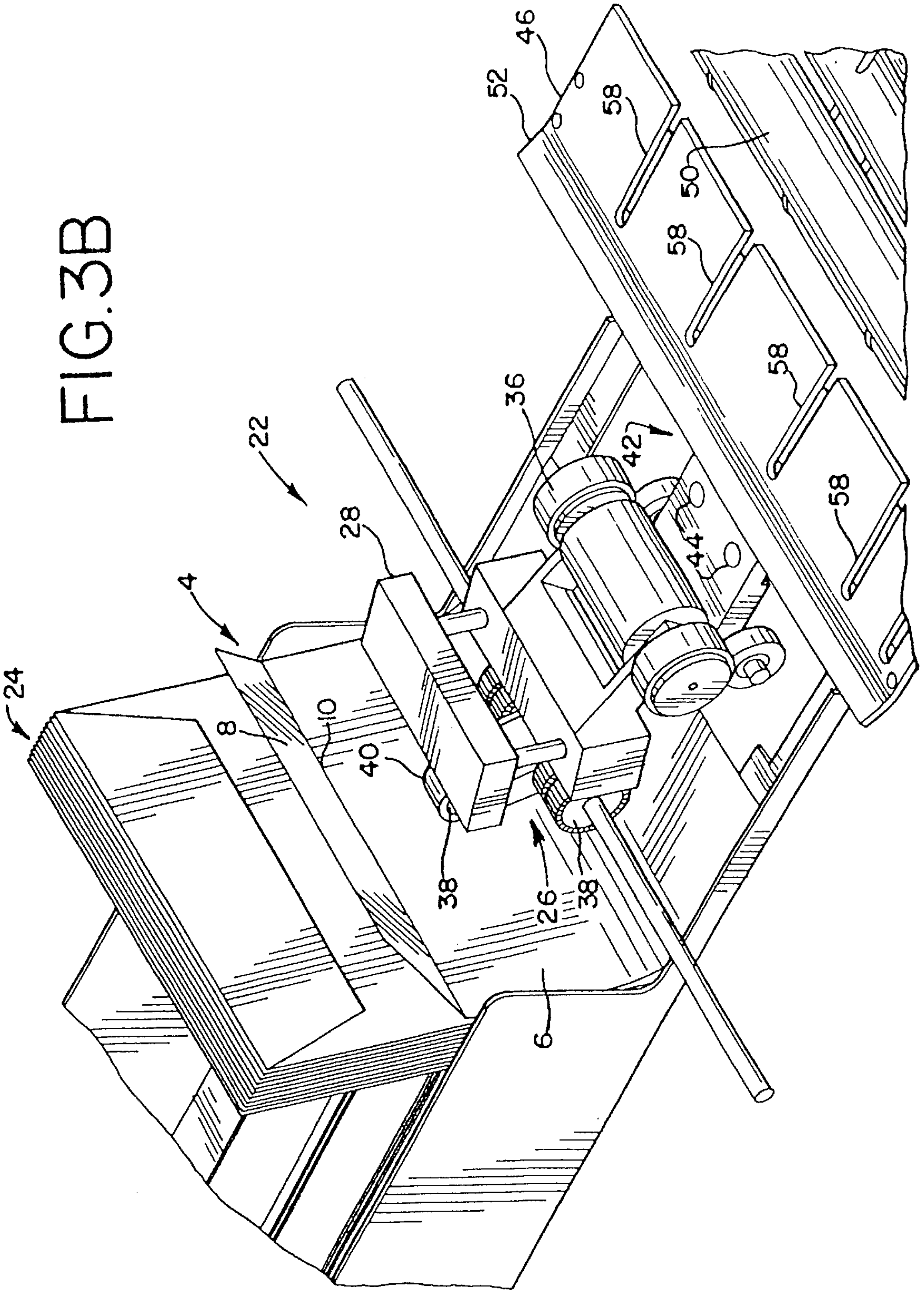
FIG. 3B is a substantially schematic perspective view of a preferred feeding assembly of the instant invention.

The envelope feeding assembly 22 avoids the delays and complications associated with the prior art methods of feeding envelopes by the simple assembly comprising a minimum of moving parts herein described and depicted in FIGS. 3A and 3B. The preferred envelope feeding assembly 22 comprises an envelope reserve means 24 to hold a reserve of envelopes 4 and a first envelope feeding conveyor 26 adapted to urge a foremost envelope in the envelope reserve means 24 downward and out of the envelope reserve means 24. A flap opening means 28 for forcing open the flap of each envelope is positioned adjacent the first envelope feeding conveyor 26.

The envelope reserve means 24 is configured to hold a reserve of envelopes 4 therein in a flap-closed configuration. The flap-closed configuration comprises the flap 8 of the envelope 4 folded along connecting edge 10 and resting over the envelope body 6. Because envelopes are typically sold in this flap-closed configuration for packaging and shipping efficiency, the instant invention is configured to accept envelopes in this flap-closed configuration.

Furthermore, each envelope is preferably oriented in the envelope reserve means 24 such that the connecting edge 10 of the envelope 4 represents the top of the envelope such that the envelope flap 8 extends downward and overlies envelope body 6. The connecting edge 10 of the envelope body 6 defines a crease formed by folding the envelope flap 8 over the envelope body 6. The envelopes 4 are further oriented such that the flap 8 faces the first envelope feeding conveyor 26 and flap opening means 28 such that the flap 8 of the foremost envelope 4 in the envelope reserve means 24 will be adjacent the first feeding conveyor 26. This configuration is depicted in FIGS. 3A and 3B.

The envelope reserve means 24 is configured such that the foremost reserve envelope is urged into contact with the envelope first feeding conveyor 26 by a reserve means advancer 30. The various envelope reserve means and reserve means advancers known in the art are contemplated. The preferred reserve means advancer 30, depicted in FIGS. 3A and 3B comprises a belt 32 positioned around a plurality of rollers 34. An envelope support means 35 keeps the envelopes in an upright position. In operation, the envelopes rest on belt 32 which advances the reserve envelopes toward the first feeding conveyor 26 such that the foremost envelope 4 is in contact with that first feeding conveyor 26. Furthermore, it is to be understood that the orientation of the envelope reserve means 24 depicted in FIGS. 3A and 3B is merely the preferred embodiment and that any configuration or orientation would suffice. It is also to be understood that known methods and apparatus for continuous reloading of the envelope reserve means 24 are contemplated as well.

In the preferred embodiment of the envelope feeding assembly 22, the first feeding conveyor 26 is configured to rest in contact with the body 6 of the foremost envelope in the envelope reserve means 24 such that envelope flap 8 of that envelope may swing open freely without interference from the first feeding conveyor 26 when the foremost envelope is substantially undisplaced from the envelope reserve means 24. Flap opening means 28 lies opposite of the envelope reserve means 24 from the first feeding conveyor 26. The flap opening means 28 is adapted to emit a stream of air directed toward the foremost envelope of the envelope reserve means 24 in a manner which will rotate the envelope flap 8 of a foremost envelope into the flap-opened position. Consequently, the flap 8 of each envelope will be rotated into the flap-open position while substantially undisplaced from the envelope reserve means 24.

As that foremost envelope is drawn down, the second-in-line envelope which rests immediate adjacent to the foremost envelope is increasingly exposed until the foremost envelope has cleared the entire flap 8 of the second-in-line envelope. Once the envelope flap 8 of the second-in-line envelope is no longer covered by the foremost envelope, the stream of air pressure emanating from the flap opening means 28 will catch the envelope flap 8 of the second-in-line envelope, rotate it into the flap-opened position and hold that flap 8 in that position until that envelope 4 has become the foremost envelope and is drawn down by the first feeding conveyor 26.

It is to be understood that any manner known in the art of creating said air pressure may be employed as the flap opening means 28. These may include, but are not limited to, piping in pre-compressed air or adapting a fan to act as the flap opening means. Furthermore, the flap opening means 28 is movable both vertically and angularly to ensure that the airstream of the flap opening means 28 may strike the flap 8 of the foremost envelope at an angle which would most efficiently open the flap 8 of that envelope regardless of said envelope's size. Furthermore, it is to be understood that other flap opening means may be employed in conjunction with the instant envelope packing apparatus 2 without departing from the scope thereof.

When configured in the above described preferred orientation, the feeding assembly of the instant invention will blow open the flap 8 of the foremost envelope of the envelope reserve means 24 and that foremost envelope will be drawn down and away from the envelope reserve means 24 by first feeding conveyor 26 toward the defect detection means 42 in the flap-opened position. Prior to the foremost envelope being drawn down by the first feeding conveyor 26, the envelope flap 8, although held in the open position by the flap opening means 28, is biased toward the flap-closed position due the a crease in the envelope running along the connecting edge 10 of the envelope body 6. However, when the connecting edge 10 of the envelope body 6 passes between the first feeding conveyor 26 and the second-in-line envelope, the crease in the envelope is substantially flattened such that the envelope flap 8 is thereafter biased toward the flap-open position.

In the first preferred embodiment shown generally in FIGS. 3A and 39, a second feeding conveyor 36 may be positioned between the first feeding conveyor 26 and the defect detection means 42. The second feeding conveyor 36 is adapted to contact an envelope drawn by the first feeding conveyor 26 prior to that envelope completely leaving contact with the first feeding conveyor 26. In this manner, the second feeding conveyor 36 assures that each envelope 4 is quickly directed to the defect detection means 42. The second feeding conveyor 36 serves the additional purpose of further flattening the crease at the connecting edge 10 of the envelope body 6 such that the flap 8 of each envelope is insured to be biased to the flap-opened position and each envelope exiting the feeding assembly 22 of the instant invention will lie substantially flat.

In a second preferred embodiment (not depicted), a first feeding conveyor 26' is not positioned to be clear of the flap 8 of the foremost envelope in the envelope reserve means 24 while it rests thereon. Rather, the first feeding conveyor 26' rests on at least a portion of flap 8 of the foremost envelope in the envelope reserve means 24. In this embodiment, the flap opening means 28' is configured such that when the first feeding conveyor 26' has drawn down and urged the foremost envelope of the envelope reserve means 24 toward the defect detection means 42 and out of contact with the first feeding conveyor 26', the stream of air pressure emitted from flap opening means 28' will catch the flap 8 of that envelope and rotate it into the flap-opened position. This embodiment also preferably employs a second feeding conveyor 36' to ensure quick direction of each envelope to the defect detection means 42 and to ensure that the each envelope 4 is not displaced by the air pressure emitted from the flap opening means 28'. Furthermore, the second feeding conveyor 36' serves as the primary means for biasing each envelope flap 32 to the flap-open position in this configuration.

The feeding conveyors 26,26',36,36' are preferably rollers mounted on rotating shaft members. The preferred first feeding conveyor 26 is preferably comprised of two radially disparate rollers 38 adapted to accept a belt 40 to drive the rollers. However, a single roller could also serve the function of feeding an envelope without substantially affecting the improvements presented in the instant envelope feeding assembly 22.

In the first embodiment described above, the time required to open the flap 8 of each envelope 4 is not added into the process time of each envelope because the flap is forced open by the air pressure emitted by the flap opening means 28 prior to that envelope being the foremost envelope. In other words, before the first feeding conveyor even contacts an envelope 4 in the envelope reserve means 24 the flap 8 on that envelope 4 has been blown open. Consequently, the time required to open the flap 8 of an envelope 4 becomes irrelevant to the feeding rate of the instant envelope packing apparatus 2.

In the second embodiment described above, the time required to open the flap 8 of each envelope 4 is not added into the process time of each envelope because the flap is forced open by the air pressure emitted by the flap opening means 28' while the envelope is being transported from envelope reserve means 24 to the defect detection means 42. In other words, the flap opening operation is accomplished simultaneously with another operation such that the time required to open the flap 8 of each envelope 4 becomes irrelevant to the packing rate of the instant packing apparatus 2.

In addition to rendering the time required to open the flap 8 of each envelope 4 irrelevant, the instant invention is accomplished in a simple manner with a minimum of parts to reduce manufacturing and maintenance costs. The instant invention requires only the first feeding conveyor 26 and the flap opening means 28.

Figure 3C:
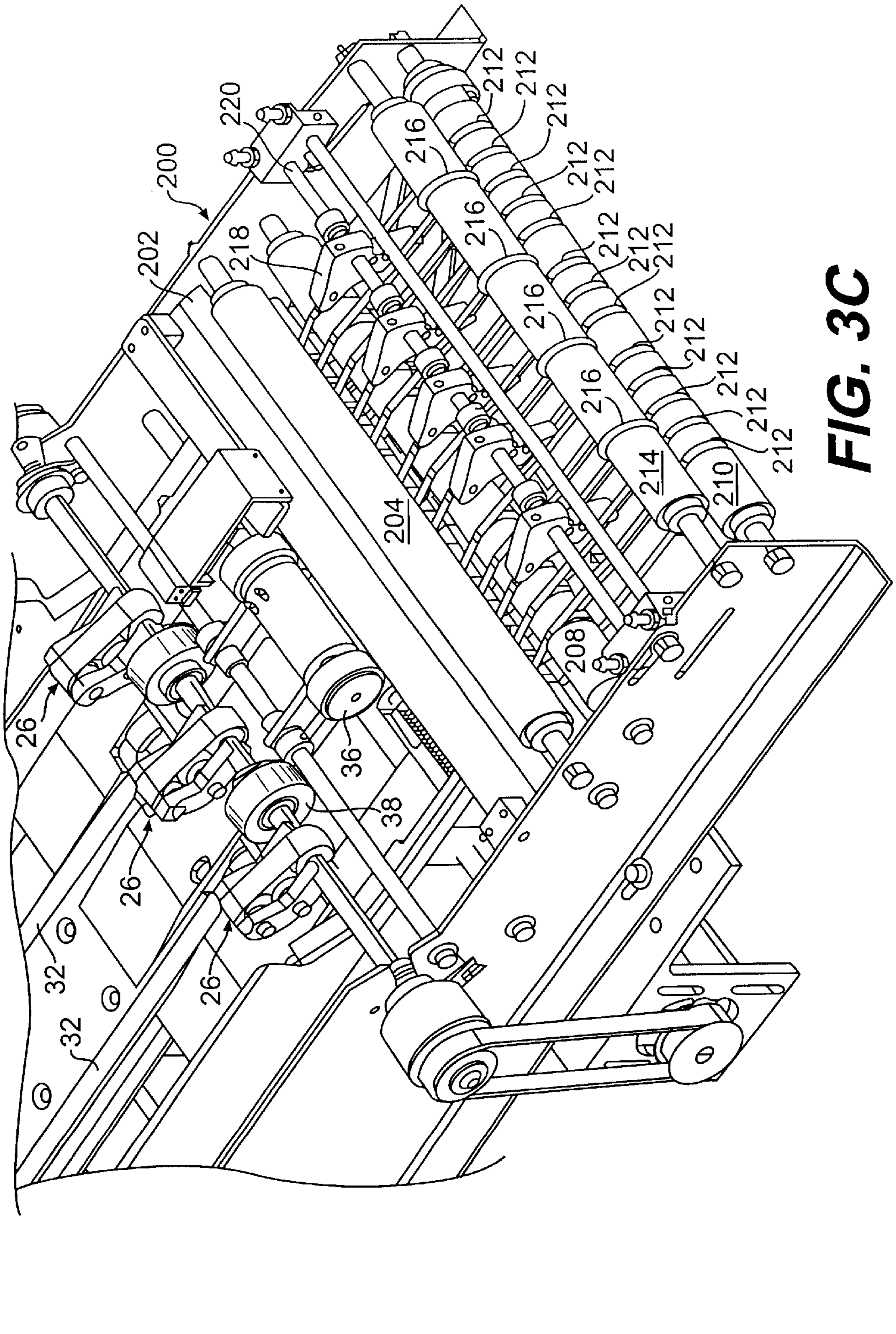
FIG. 3C is a substantially schematic perspective view of an alternative preferred envelope flap opening assembly.
Figure 3D:
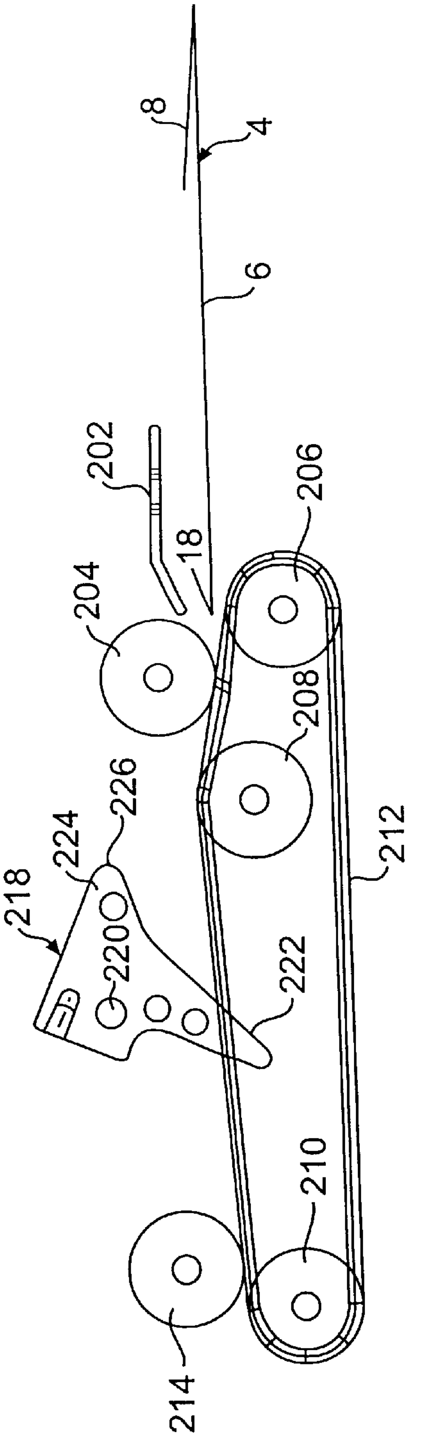
FIGS. 3D–3M are substantially schematic cross-sectional views of the alternative preferred envelope flap opening assembly depicting incremental stages of an envelope passing therethrough.

FIGS. 3C–3M depict an alternative configuration facilitating the opening of envelopes and replacing the flap opening means 28 of the previously described embodiments with an alternative flap opening assembly 200. As depicted in FIG. 3C, the alternative flap opening assembly 200 is positioned down stream of the envelope feeding assembly 22 rather than being incorporated therein as in the embodiments previously described. As shown in FIG. 3C, the alternative flap opening assembly 200 is preferably positioned adjacent to the envelope feeding assembly 22 to accept singular envelopes 4 therefrom.

The alternative flap opening assembly 200 preferably comprises an envelope deflector 202, a first opening roller 204, a second opening roller 206 (seen best in FIG. 3D), a third opening roller 208, a fourth opening roller 210, a conveyor belt 212, a fifth opening roller 214 and at least one opening element 218. The conveyor belt 212 is an endless belt extending around the second, third and fourth opening rollers 206, 208 and 210 and running in contact with the first and fifth opening rollers 204 and 214 which are positioned outside of the conveyor belt 212.

In this configuration (best depicted in FIGS. 3D–3M), the envelope bottom 18 of an envelope ejected from the envelope feeding assembly 22 will be directed between the conveyor belt 212 and the first opening roller 204 by the envelope deflector 202. As depicted in FIGS. 3D–3M, the second, third and fourth opening rollers 206, 208 and 210 are within the conveyor belt 212 and each rotated counter-clockwise in coordination with the conveyor belt 212 to direct each envelope 4 from the envelope feeding assembly 22 past the opening element 218. Conversely, it can be seen that the first and fifth opening rollers 204 and 214 will rotate clockwise (as depicted in FIGS. 3D–3M) because they are positioned outside of the conveyor belt 212. Accordingly, the rotation of the first and second opening rollers 204 and 206 will assist in directing each envelope 4 between the first opening roller 204 and the conveyor belt 212.

Each opening element 218 is mounted on an opening element shaft 220 and comprises and actuating arm 222 and a finger 224 comprising a rounded leading edge 226. The actuating arm 222 is configured to be larger and/or heavier than the finger 224 so that the actuating arm 222 will be biased by gravity to hang below the portion of the conveyor belt 212 which extends between the third and fourth opening rollers 208 and 210. By causing the actuating arm 222 to be so positioned, the bottom of each envelope 4 traveling through the alternate flap opening assembly 200 will encounter the actuating arm 222 as depicted in FIG. 3F and cause the opening element 218 to rotate about the opening element shaft 220 thereby directing the opening finger toward the envelope 4.

Figure 3E:
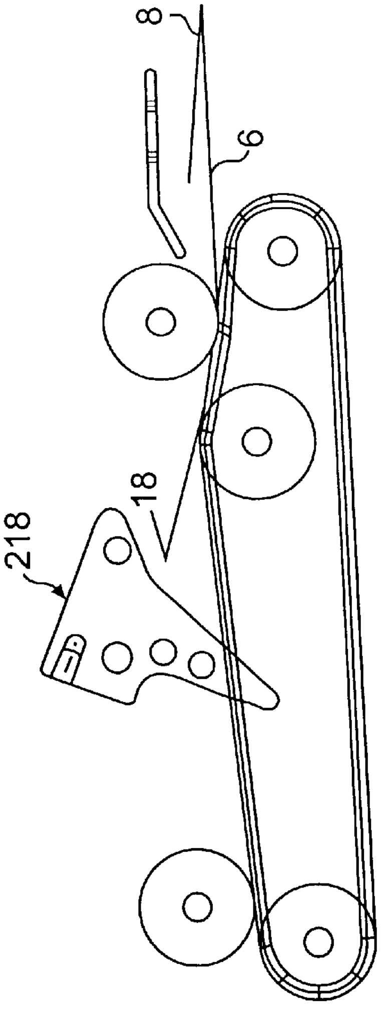
Figure 3F:
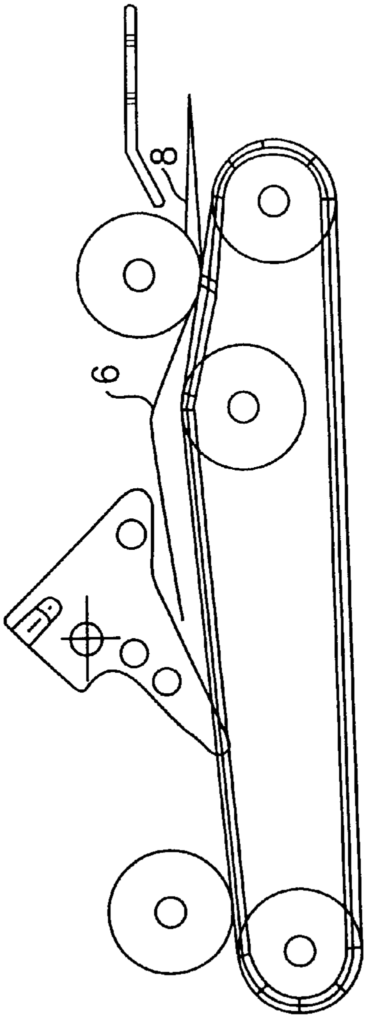
Figure 3G:
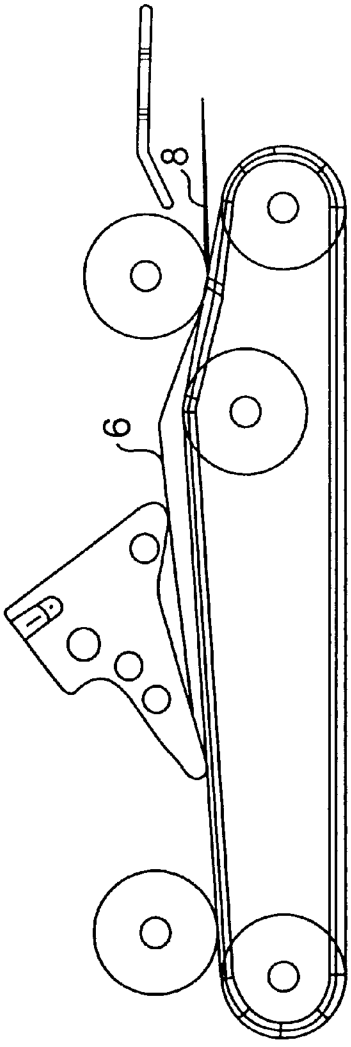
Figure 3H:
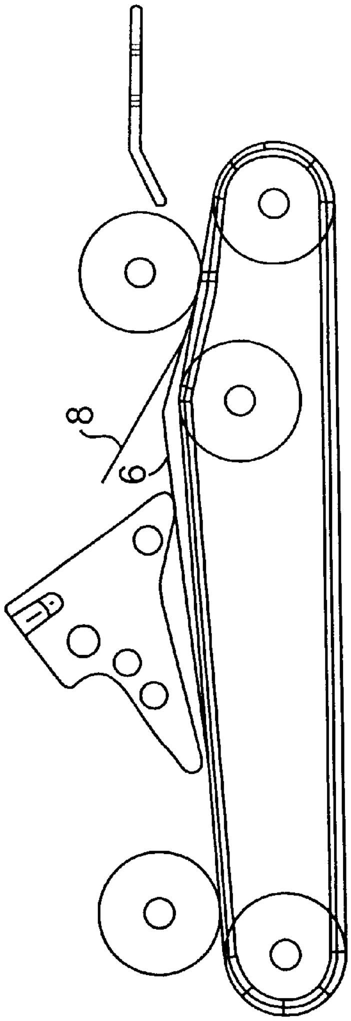
Figure 3I:
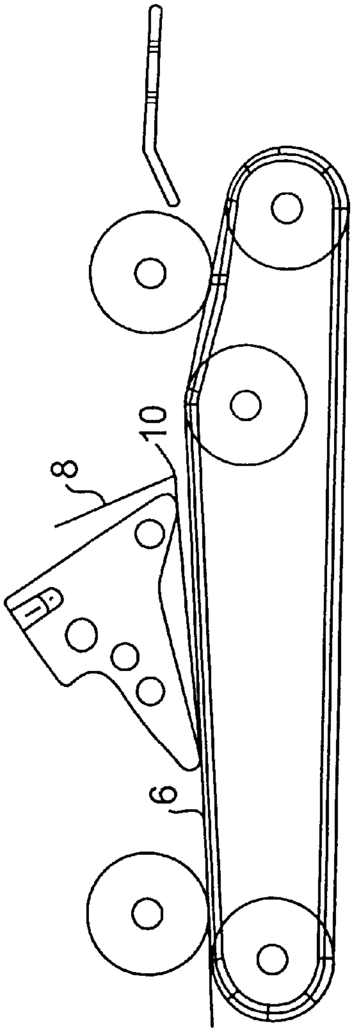
Figure 3J:
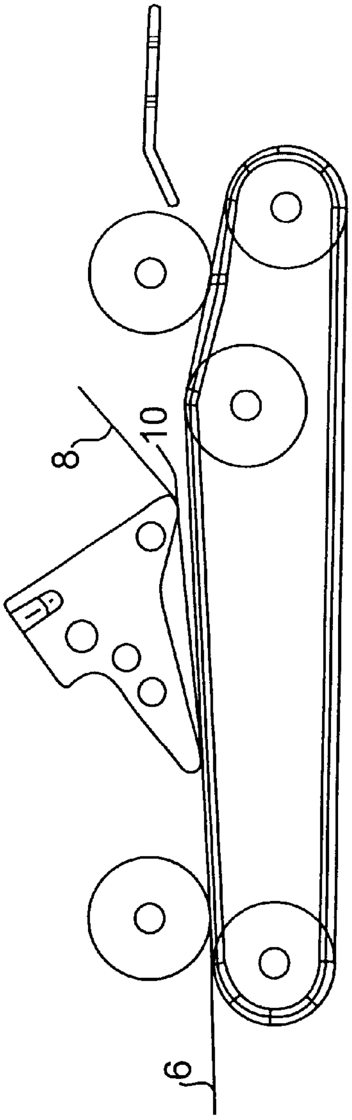
Figure 3K:
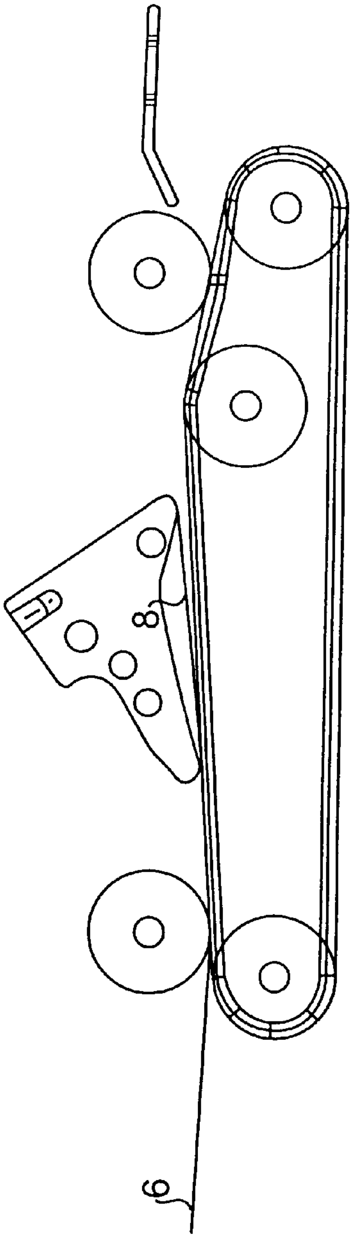
Figure 3L:
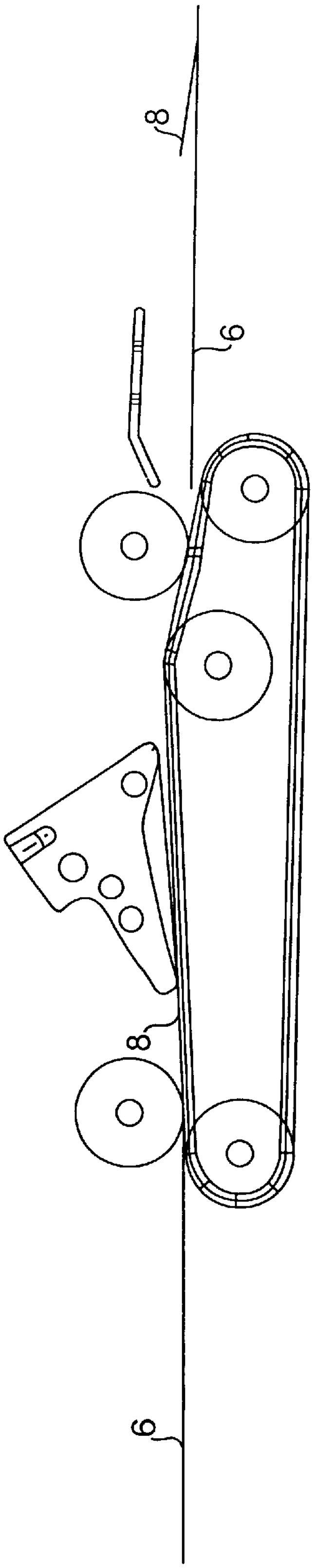

FIG. 3E depicts the envelope bottom 18 approaching the opening element 218 and angled upward of the conveyor belt 212 as a result of the first opening roller 204 forcing the envelope body 6 into the conveyor belt 212 and the third opening roller 208 directing the envelope body 6 upward from the conveyor belt. Each consecutive portion of the envelope is also directed upward in this manner as it passes between this configuration of the first and third opening rollers 204 and 208 as depicted in FIGS. 3E–3H. Importantly, this configuration also biases each envelope flap 8 to a partially open position as the flap 8 passes thereby and as depicted in FIGS. 3H–3I.

Figure 3M:
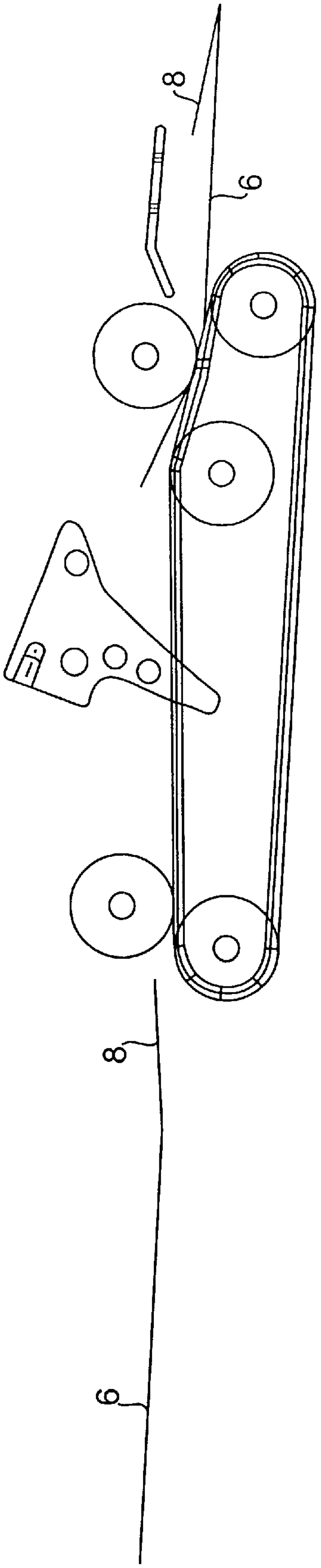

FIGS. 3D–3M depict the incremental stages of an envelope 4 passing through the alternative envelope opening assembly 200. As previously discussed, the actuating arm 222 is biased to a position in which each envelope bottom 18 is forced into contact therewith as seen in FIG. 3E. The entire opening element 218 is then rotated by the force of the envelope 4 so that the opening finger is forced downward and the leading edge 226 of the opening finger lies in a position adjacent to, or in contact with, the envelope body 6. As the envelope body 6 slides under the opening finger leading edge 226, the envelope flap 8 which is biased to a partially opened position as discussed above, is forced to a fully opened position by the opening finger 224 as depicted incrementally in FIGS. 3H–3L. Once the fully opened envelope 4 passes the limits of the actuating arm 222, the opening element 218 is free to swing back to its biased position and receive another envelope as depicted in FIG. 3M. As shown in FIG. 3C, the alternative envelope opening assembly preferably comprises a plurality of conveyor belts 212 and a plurality of opening elements 218 operating therebetween.

It to be understood that each of these envelope opening configurations may be used with any size envelope and will properly open any envelope regardless of the envelope window placement without the prospect of damage to the envelope flap 8 or the window. It is also to be understood that other configurations and orientations of the above described envelope feeding apparatuses which may be employed do not depart from the scope of the instant invention.

The defect detection means 42 is positioned adjacent the feeding assembly 22. The preferred embodiment of the defect detection means 42 can be seen generally in FIGS. 3A,4A and 4B. The defect detection means 42 comprises a fiber optic sensor 44 positioned adjacent to the flap opening means 28. The sensor 44 is directed upward toward the foremost envelope 4 in the envelope reserve means 24. The flap 8 of an envelope 4 having said flap 8 blown open by the flap opening means 28 will hang downward in front of the envelope as depicted in FIG. 3A. The amount which that flap 8 hangs down will depend upon the force of the air directed at that flap 8. If a flap 8 does not open, upon contacting the air of the flap opening means 28, the flap will not be hanging outward of the envelope body 6. Therefore, the sensor 44 can distinguish whether the flap 8 on the foremost envelope 4 has opened by whether of not it detects the flap 8 hanging outward of the envelope body 6.

A second sensor 45 is positioned at the exit of the feeding assembly 22 and under the path of travel of the envelopes. The sensor 45 is employed to detect whether or not an envelope 4 has been fed. This information can be used to signal malfunction in the feeding assembly 22 or an empty envelope reserve means 24.

A rejection arm 46 is positioned above a first roller 48 and laterally adjacent to the sensor 44. A second roller 50 is positioned at a distance from the first roller 48. Rejection arm 46 comprises a downwardly angled portion 52 at the front thereof. As each envelope 4 exits the feeding assembly 22 it encounters rejection arm 46. The downwardly angled portion 52 guides the leading edge of each envelope under the rejection arm 46 such that the rotation of the first roller 48 will draw each envelope 4 between the first roller and the rejection arm 46.

First roller 48 is rotated by a belt 54 placed around the first roller 48 and the second roller 50. The gap between the first roller 48 and second roller 50 is left otherwise completely unobstructed such that the rejection arm 46 may be rotated to deflect defective envelopes downward between the first and second rollers 48,50 to remove them from the system.

Figure 4A:
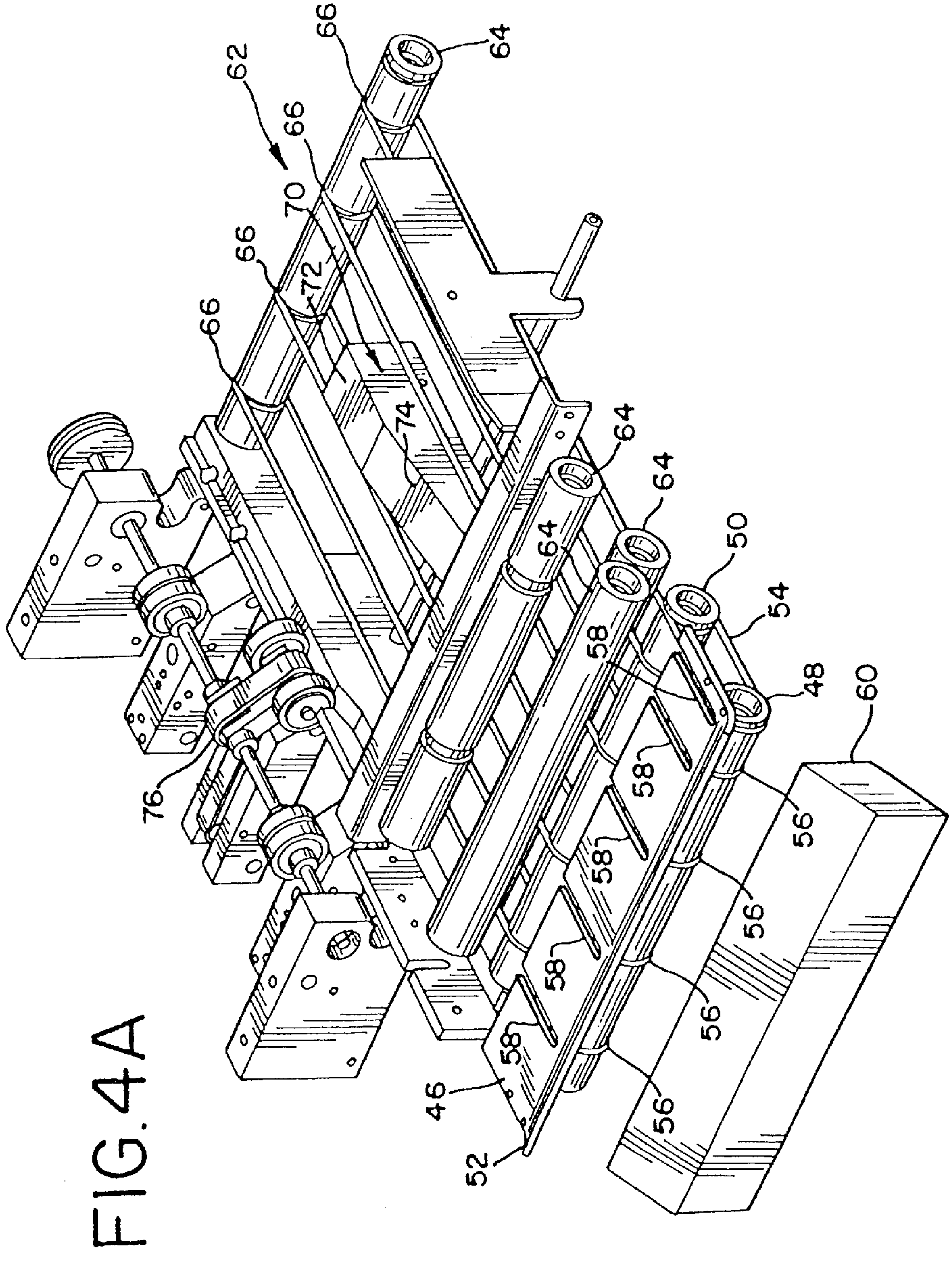
FIG. 4A is a substantially schematic perspective view of the rejection portion of the defect detection and rejection means and the first bottom feeder of the instant invention.
Figure 4B:
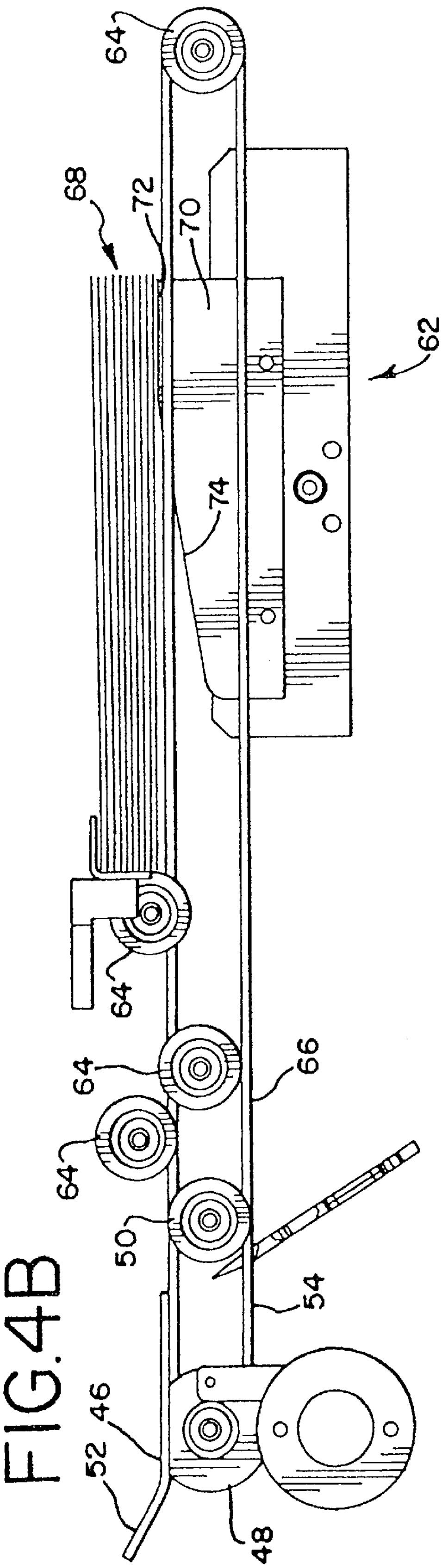
FIG. 4B is a substantially schematic cross-sectional view of the rejection portion of the defect detection and rejection means and the first bottom feeder of the instant invention.

To ensure that each envelope 4 leaving the feeding assembly 22, whether defective or not, is properly propelled through the defect detection assembly 42, the first roller 48 preferably comprises a plurality of rings 56 therealong. Each of the plurality of rings 56 protrudes beyond the outer circumference of the first roller 48 such that each envelope rests on the plurality of rings 56 as it passes between the first roller 48 and the rejection arm 46. As best seen in FIG. 4A, the rejection arm 46 preferably comprises a plurality of slots 58 positioned above the first roller 48 such that each of the plurality of rings 56 located along the first roller 48 has a corresponding slot 30 located thereabove. The rejection arm 46 is preferably positioned at a distance from the outer circumference of the plurality of rings 56 which is less than the thickness of each envelope 4 to travel therebetween. In this manner, the plurality of rings 56 may slightly deform each envelope 4 into the plurality of slots 58 along the rejection arm to assure proper friction between the plurality of rings and the envelope 4. Proper friction can be further assured by employing a proper material for said rings 56.

When an envelope 4 has not been properly opened, the sensor 44 sends a signal to the rejection arm 46 and the slotted end of that rejection arm rotates downward between the first and second roller 48,50 to deflect the defective envelope 4 out of the system and into a defect area 60.

All properly opened envelopes proceed from the first roller 48 to the second roller 50 unobstructed by rejection arm 46 and then to the bottom stacking assembly 62. The first roller 48 turns in continuous rotation to feed each consecutive envelope 4 to the entrance to the first bottom feeder 62 which comprises a plurality of rollers 64 which operate in conjunction with the second roller 50 of the defect detection means 42 to rotate a plurality of transport belts 66. Transport belts 66 are continuous belts which extend from the second roller 50 to the first bottom feeder for transporting each consecutive envelope 4 from the defect detection area 42 to the buffer stack 68.

The first bottom feeder 62 places each envelope fed from the transport belts 66 at the bottom of the buffer stack 68. This is accomplished by positioning an elevating base 70 at the bottom of the buffer stack 68 between transport belts 66. The elevating base 70 is positioned in the path of the transport belts 66 such that each envelope 4 delivered by the transport belt is elevated off of the transport belt to an elevated platform 72 by an elevating ramp 74 of the elevating base 70. In normal operation, a plurality of envelopes will rest atop of the elevated platform 72 to constitute the buffer stack 68. As a new envelope is delivered by the transport belt 66 it contacts the elevating ramp 74 and is slid under the bottom most envelope in the buffer stack 68 such that the bottom most envelope is raised off of the elevated platform 72 to rest on the newly positioned envelope. In this manner, when each envelope in the buffer stack 68 is removed from the top thereof a first-in-first-out procession is accomplished in the first bottom feeder 62. In other words, the envelopes proceed from the first bottom feeder 62 in the same order that they came into the first bottom feeder 62.

Each envelope 4 is removed from the buffer stack 68 by a buffer stack prompter 76 which may remove the uppermost envelope of the first buffer stack 68 regardless of the number of envelopes in said buffer stack 68. The buffer stack prompter 76 rests atop the buffer stack 68 and consecutively feeds envelopes 4 to the intermediate conveyor 78. In a preferred configuration, the buffer stack prompter 76 comprises a roller which can rotate either continuously or intermittently to supply the envelopes to the intermediate conveyor 78 as needed to supply a continuous and uninterrupted supply of envelopes to the packing assembly 104.

It should be understood that the buffer stack 68 allows for a smooth and uninterrupted flow of envelopes to the intermediate conveyor 78, and ultimately to the packing assembly 104, in spite of the fact that envelopes may have been removed at the defect detection assembly 42. This is accomplished by conditioning the feeding of each envelope 4 by the feeding assembly 22 upon the number of envelopes, or alternatively the height of envelopes, in the buffer stack 68. When an envelope is rejected from the stream of envelopes by the defect detection assembly 42 the number of envelopes coming into the buffer stack 68 will be less than the number of envelopes being removed from the buffer stack 68. The level of the buffer stack 68 will necessarily, therefore, decrease. By conditioning the rate at which envelopes are feed from the feeding assembly 22 upon the level of the buffer stack 68 the envelope feed rate can be increased when an envelope has been rejected from the stream of envelopes in order to bring the level of the buffer stack 68 back to the desired operating level. Since the level of the buffer stack 68 is returned to normal operating level before that buffer stack 68 is depleted of envelopes, no interruption of envelope supply to the intermediate conveyor 78 is experienced. A smooth and uninterrupted flow of envelopes to the packing assembly 40 is thereby accomplished in spite of failure of some envelopes 4 to open. Because the down time experienced by previous assemblies not employing defect detection and rejection means and bottom stackers caused a loss of production and therefore loss of profits, the above configuration presents important improvements over the prior art.

It is contemplated, however, that a first staging assembly 250 (as depicted in FIGS. 4D–4G) may be employed in the place of the first bottom feeder 62. It will become apparent from the description below that the first staging assembly 250 handles only a single envelope 4 at a time rather than a stack of envelopes as with the first bottom feeder 62. Thus, the first staging assembly 250 provides no contribution toward making the envelope packing apparatus 2 an non-synchronous apparatus. Accordingly, were the present envelope packing apparatus 2 to employ the first staging assembly 250 and replace the second bottom feeder 84 with a staging assembly rather than a buffer stack, the envelope packing apparatus 2 would become a non-synchronous assembly.

As depicted in FIGS. 4D–4G, the first staging assembly 250 preferably comprises an intake shrouding 252, an intake conveyor 254, a first ejection conveyor 256 and a second ejection conveyor 258. In operation, an envelope is urged toward the intake shrouding 252, with the envelope bottom edge 18 representing the leading edge. The intake shrouding 252 assists in directing the envelope 4 through a first side plate 260 which is mounted opposite of a second side plate 262 between which the remaining elements of the first staging assembly 250 are mounted. As the leading edge of each envelope 4 enters the first staging assembly 250 through the first side plate 260, the envelope 4 encounters the intake conveyor 254 which is mounted to support the envelope 4 from beneath and transport the envelope 4 to a stop position shown in FIGS. 4F and 4G which is encountered when the traveling envelope contacts a stop plate 263. While the intake conveyor 254 is depicted as a pair of wheels mounted on a single shaft, it is contemplated that multiple wheels on a single shaft, or on a pair of cooperating shafts would suffice to accomplish the intake of envelopes.

Figure 4C:
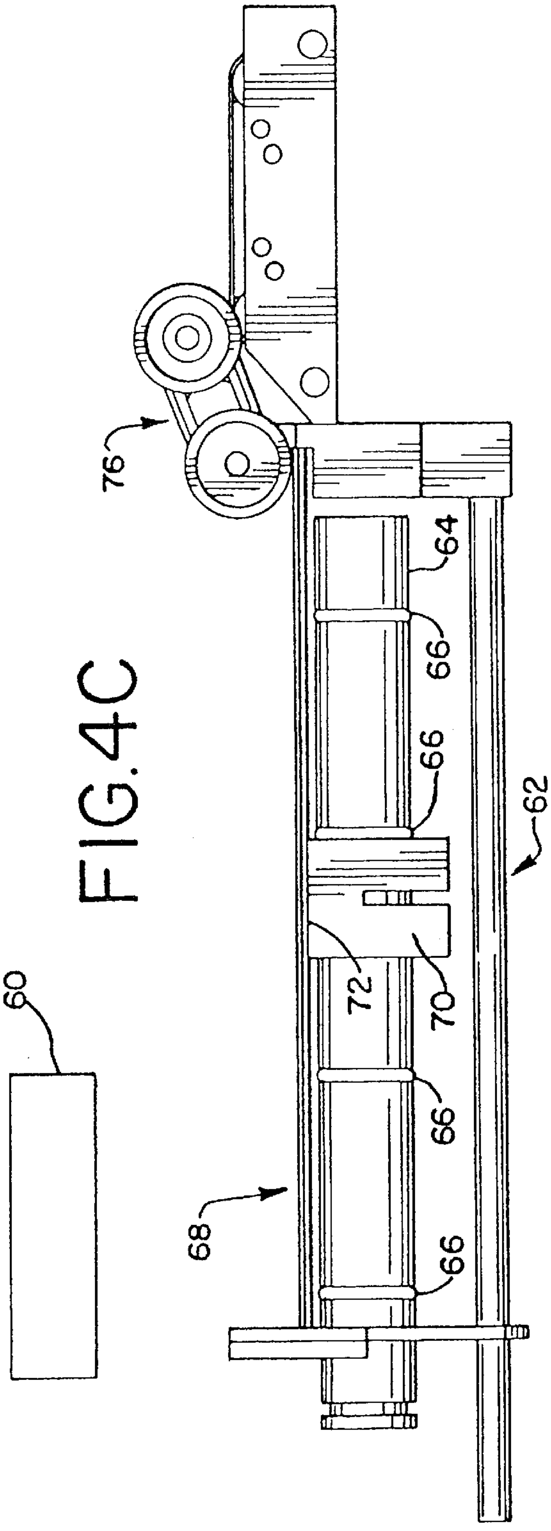
FIG. 4C is a substantially schematic cross-sectional view of the first bottom feeder of the instant invention.
Figure 4D:
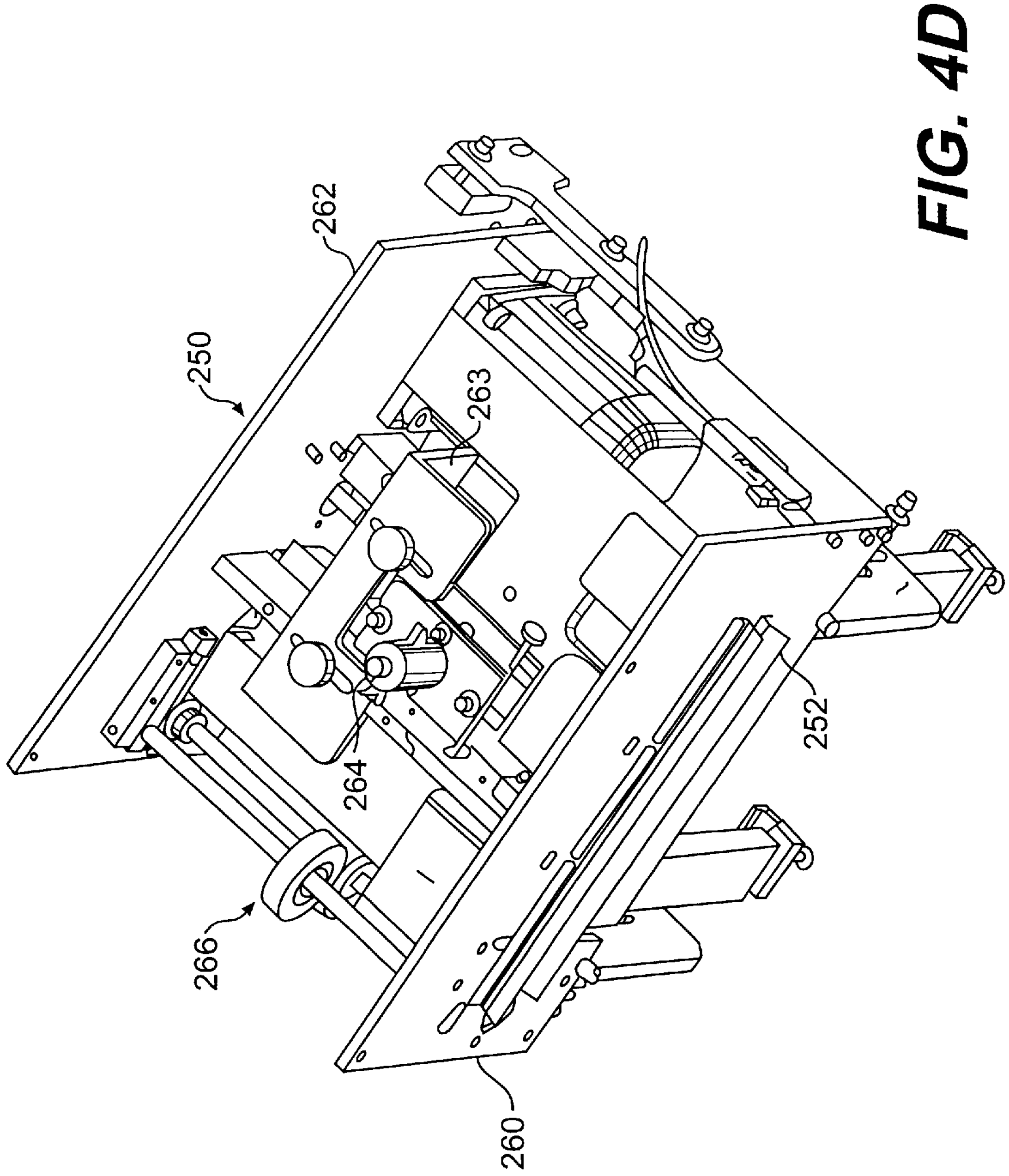
FIGS. 4D and 4E are substantially schematic perspective views of a first staging assembly as a preferred alternative to the first bottom feeder.
Figure 4E:
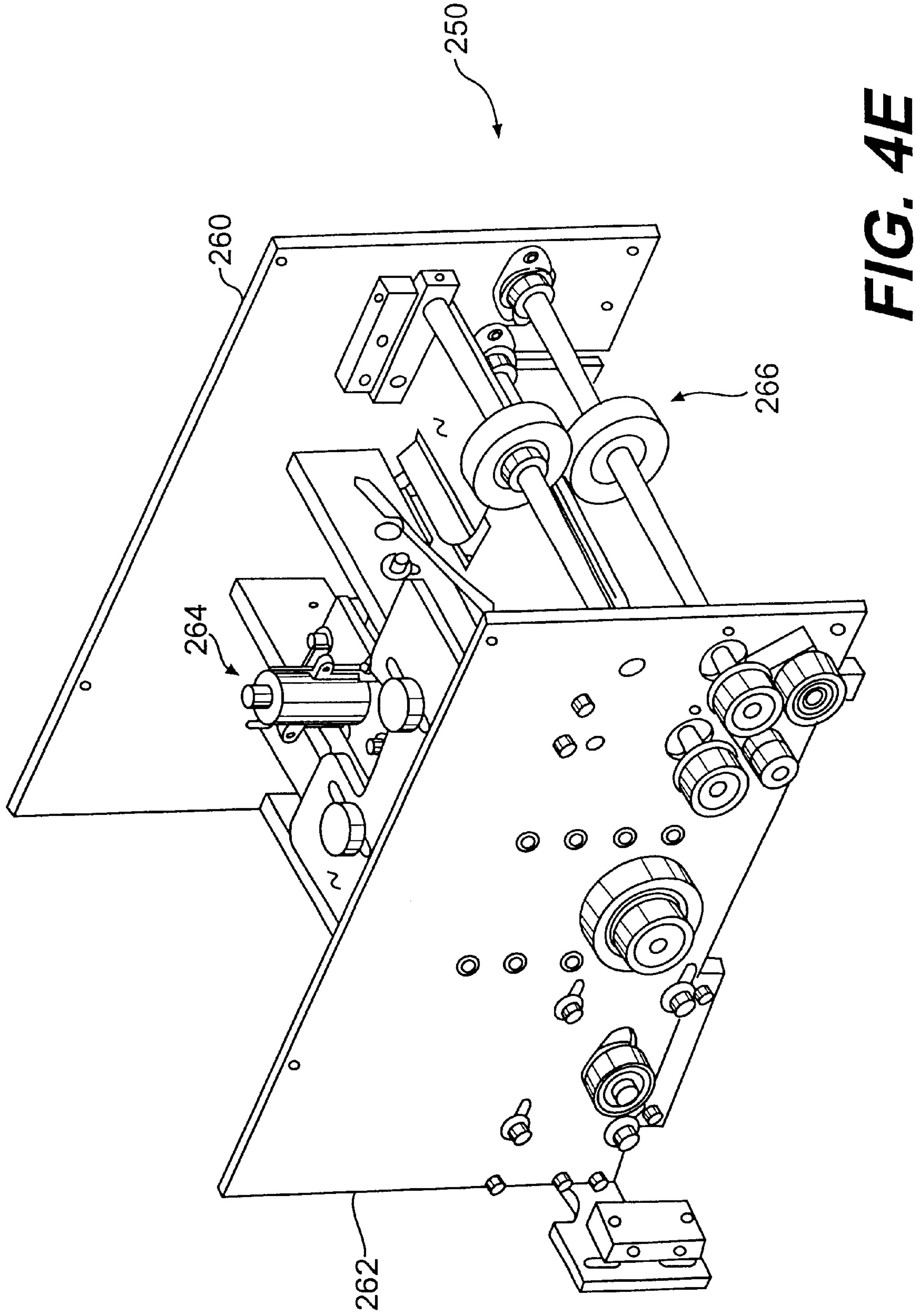
Figure 4F:
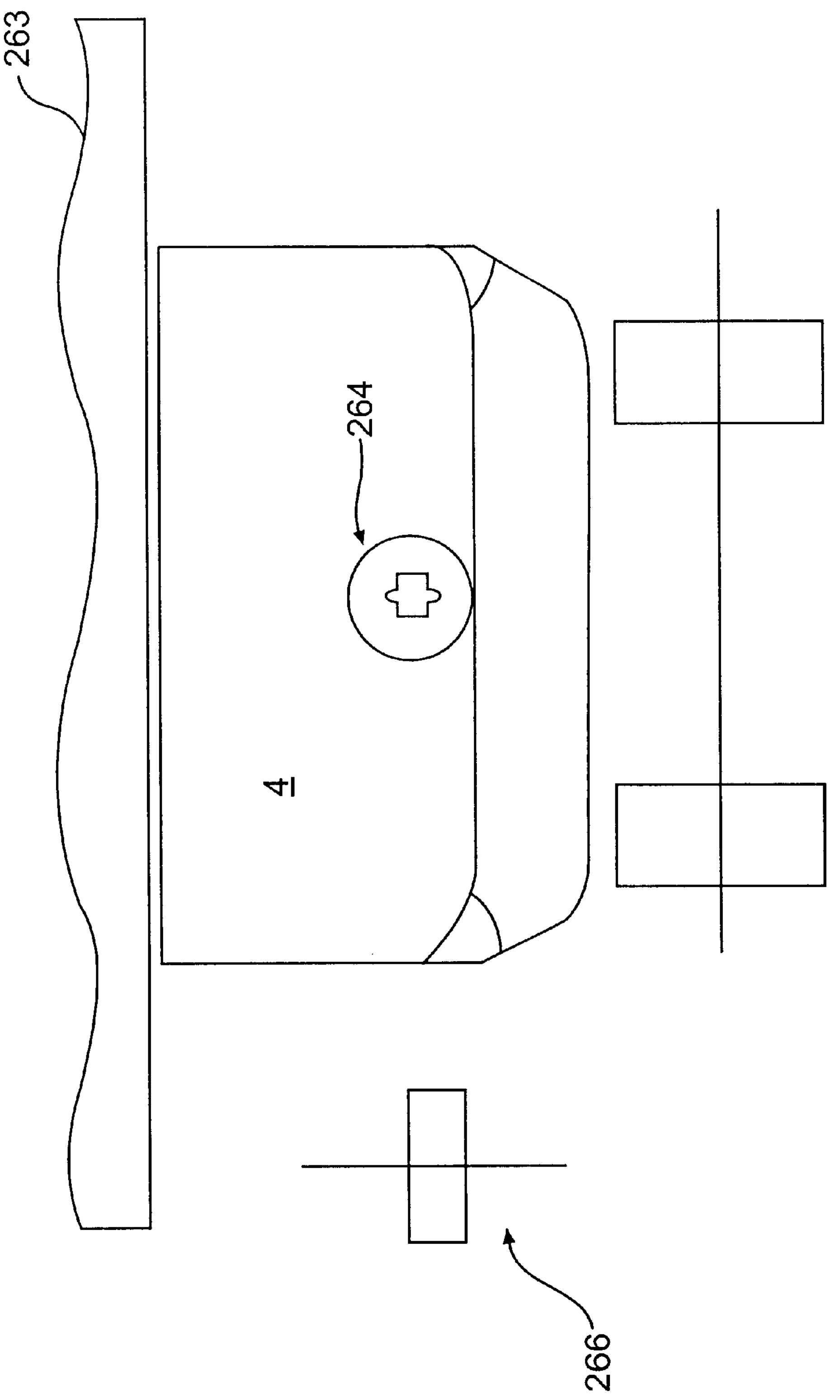
FIG. 4F is a substantially schematic top view of an envelope in the first staging assembly of FIG. 4D.
Figure 4G:
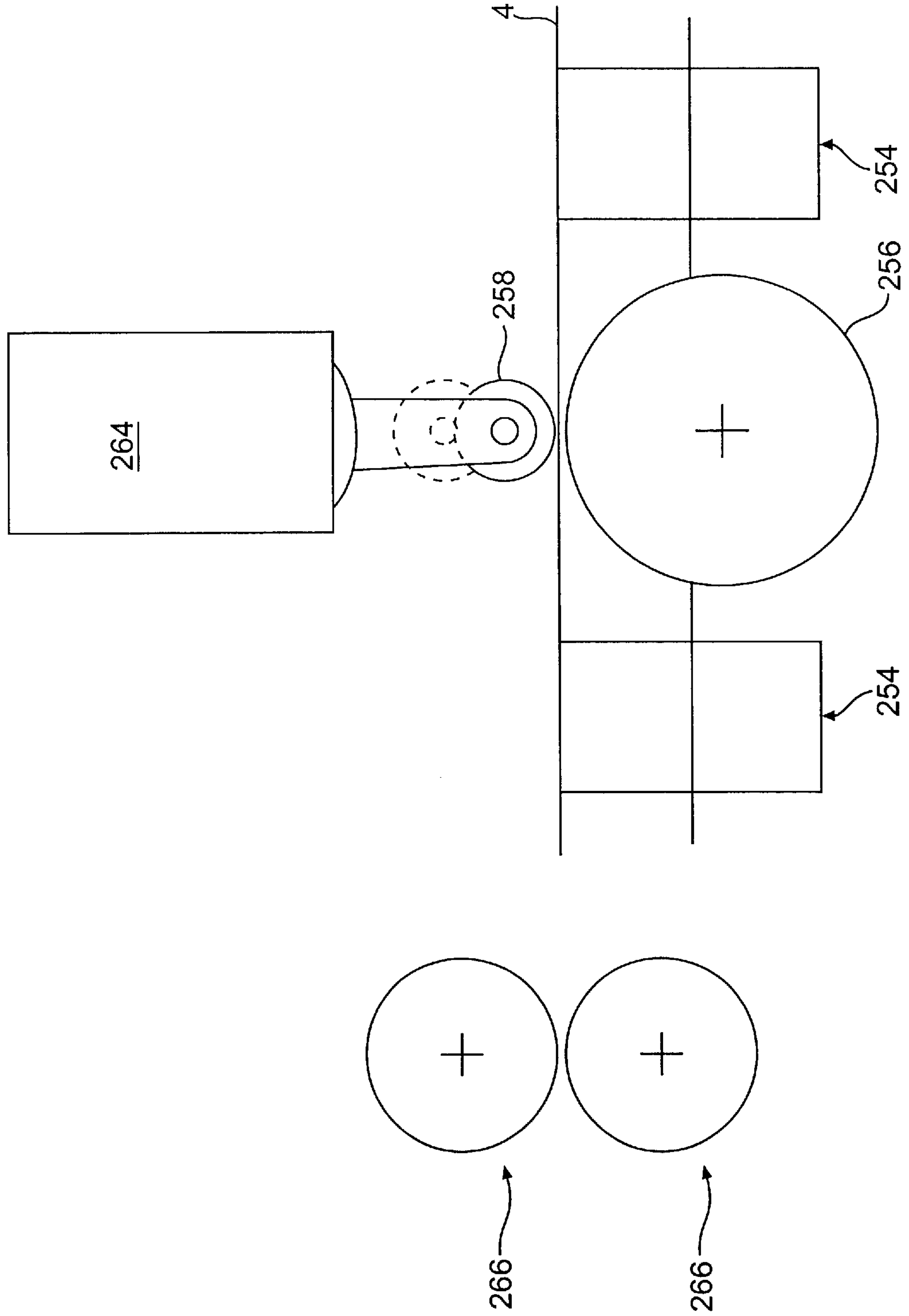
FIG. 4G is a substantially schematic cross-sectional view of an envelope in the first staging assembly of FIG. 4D.

Once in the stop position depicted in FIGS. 4F and 4G, each envelope 4 lies adjacent the stop plate 263 only momentarily while the second ejection conveyor 258 travels downward from a resting position (shown in phantom in FIG. 4G) to contact the envelope 4 and press it against the first ejection conveyor 256 which lies immediately below the envelope 4. The second ejection conveyor 258 is preferably transported downward from the resting position by a plunger 264 to contact the envelope 4. The plunger may be activated by a sensor which identifies that the envelope has entered the first staging assembly 250 or has reached the stop position. The second ejection conveyor 258, which is preferably freely rotatable, presses the envelope 4 against the first ejection conveyor 256 which is preferably driven in constant rotation. In this manner, sufficient friction is created between the first ejection conveyor 256 and the envelope 4 to allow the rotation of the first ejection conveyor 256 to force the envelope 4 from the stop position to a clearing conveyor 266 which assures that the envelope 4 is cleared from the first staging assembly 250. Although the clearing conveyor 264 is depicted as a pair of rotating shafts each comprising a single wheel, it is contemplated that multiple wheels or a single shaft may accomplish the clearing of the envelope 4 from the first staging assembly 250.

Furthermore, although the first staging assembly 250 depicts a ninety degree change of direction of travel of the envelope 4, the direction of envelope ejection may be at any desired number of degrees from the direction of intake depending upon the orientation of the first ejection conveyor 256. It to be understood that the first staging assembly may be used with any size envelope and will properly open any envelope, regardless of the envelope window placement, without the prospect of damage to the envelope flap 8 or the window. It is also to be understood that other configurations and orientations of the above described staging assembly which may be employed do not depart from the scope of the instant invention.

The intermediate conveyor 78 is preferably a vacuum conveyor which extends from the first bottom feeder 62 to the second bottom feeder 84. The envelopes fed to the intermediate conveyor 78 are drawn from the top of the buffer stack 68 and to the side thereof (see FIGS. 4A and 4C). Because the envelopes are drawn to the side of the buffer stack 68, the envelopes proceed along the intermediate conveyor 78 with a side edge 20 of the envelope 4 representing the leading edge thereof rather than the bottom edge 18 of the envelope 4 as was the case in the feeding assembly 22. It should be recognized, however, that because the envelope front wall 12 lies adjacent the intermediate conveyor 78 the open flap of the envelope still lies on the bottom side of the envelope such that it also is immediately adjacent the intermediate conveyor 78. The intermediate conveyor terminates at a second bottom feeder 84.

The intermediate conveyor 78 preferably comprises at least one vacuum conveyor belt 80 which runs along its length and a plurality of vacuum ports 82 positioned adjacent thereto. As described above, each envelope 4 is projected onto the intermediate conveyor 78 by the buffer stack prompter 76. Each envelope 4 lands upon the vacuum conveyor belt 80 of the intermediate conveyor 78 and is then sucked down by the vacuum ports 82 located therealong such that each envelope 4 remains in substantial contact with the vacuum conveyor belt 80. In this configuration, each envelope 4 may be transported from the first bottom feeder 62 to the second bottom feeder 84 at a high rate of speed by the vacuum conveyor belt 80 without the envelope lifting from the vacuum conveyor belt 80 as a result of the envelope catching air at its underside thereby forcing the envelope off of the vacuum conveyor belt 80.

Figure 5A:
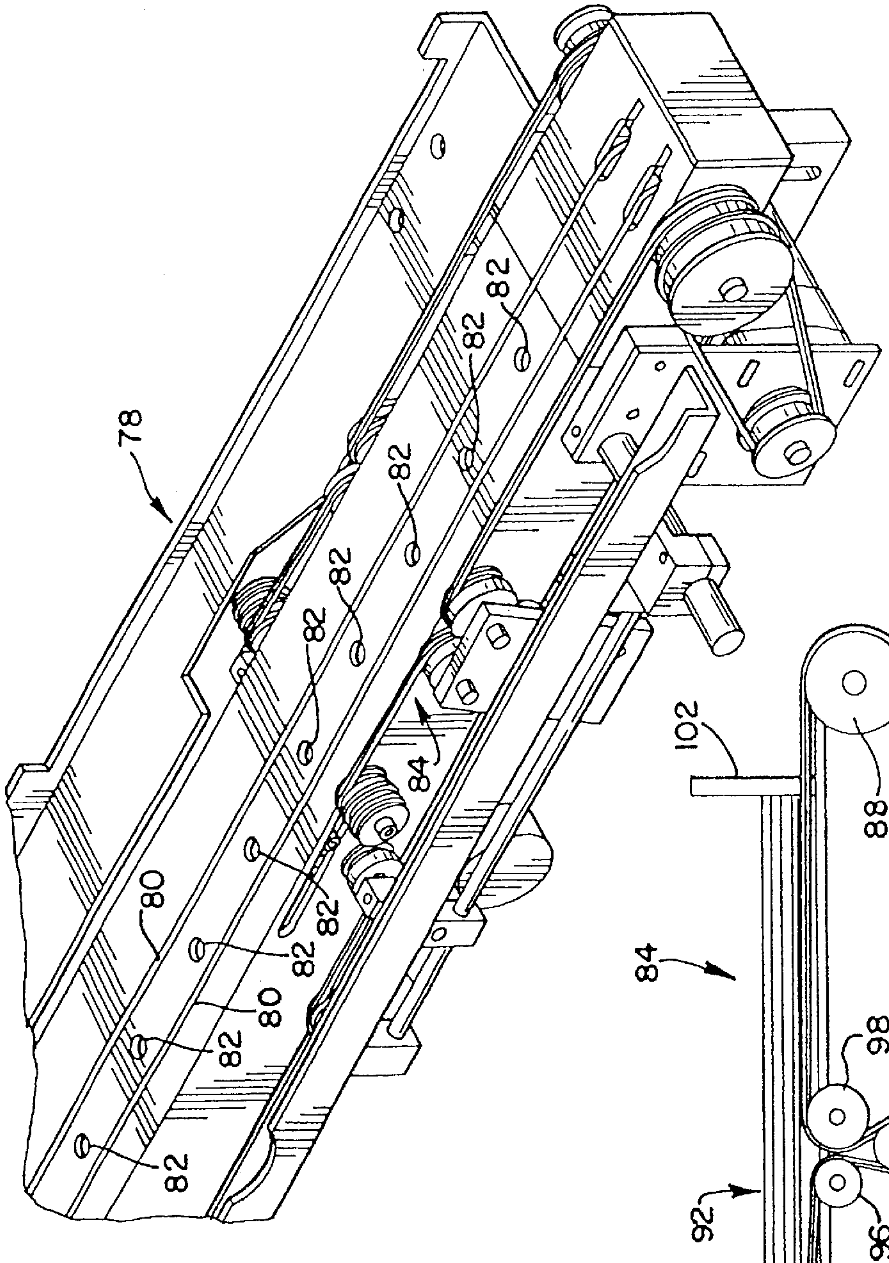
FIG. 5A is a substantially schematic perspective view of the intermediate conveyor.

FIG. 5A depicts the preferred configuration of the intermediate conveyor comprising a plurality of vacuum ports 82 positioned substantially at the middle of the intermediate conveyor 78 along the length thereof. That configuration further comprises two vacuum conveyor belts 80. The vacuum conveyor belts 80 run on opposite sides of the vacuum ports 82 along the length of the intermediate conveyor 78 such that the force created on each envelope 4 by the vacuum ports 80 is directed onto the vacuum conveyor belts 80. As depicted in FIG. 5A, the vacuum conveyor belts 80 and vacuum ports 82 continue to the end of the conveyor and under the second bottom feeder 84 which lifts each envelope 4 off of the vacuum conveyor belts 80.

Figure 5B:
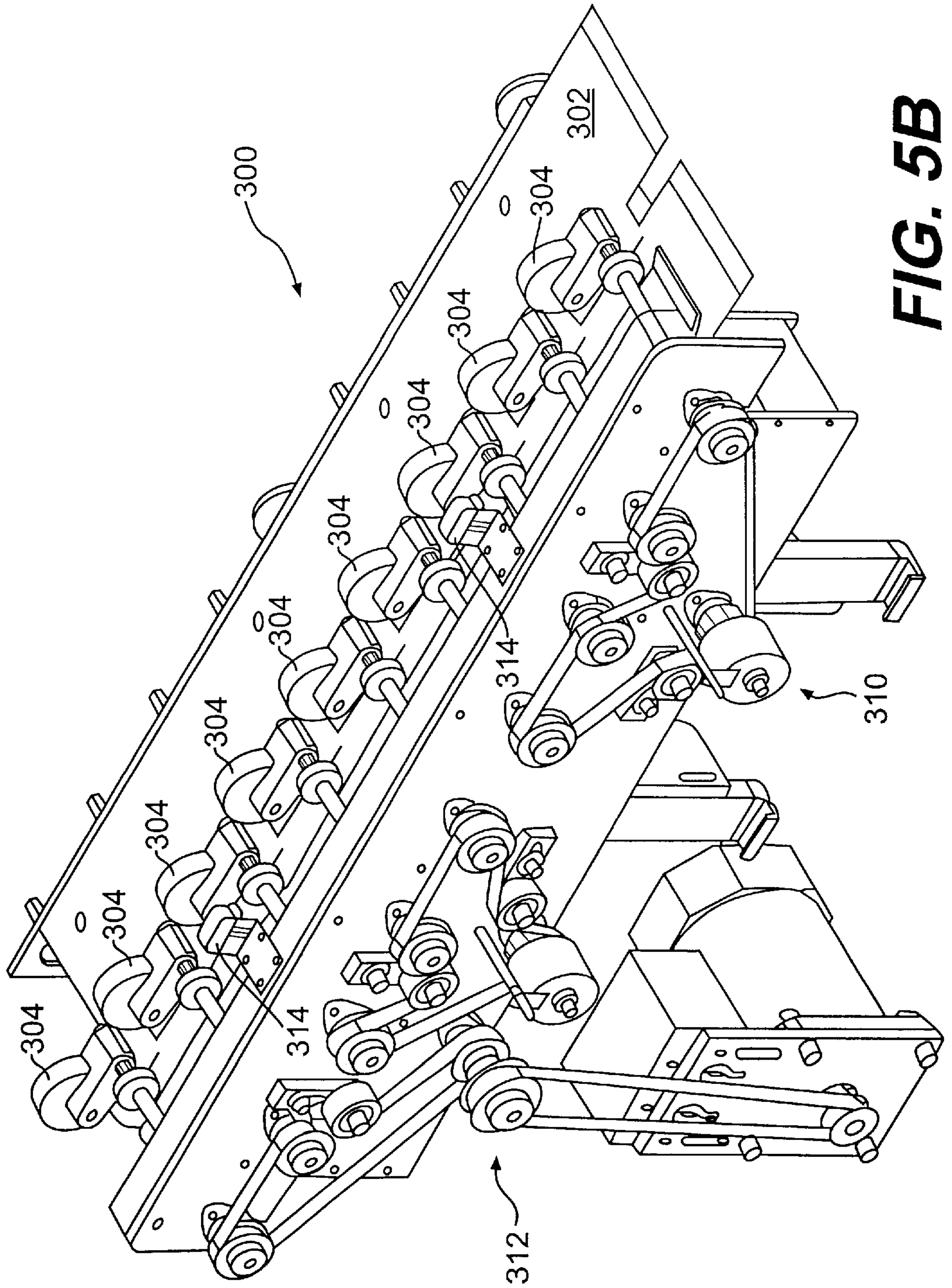
FIG. 5B is a substantially schematic perspective view of an alternative intermediate conveyor.
Figure 5C:
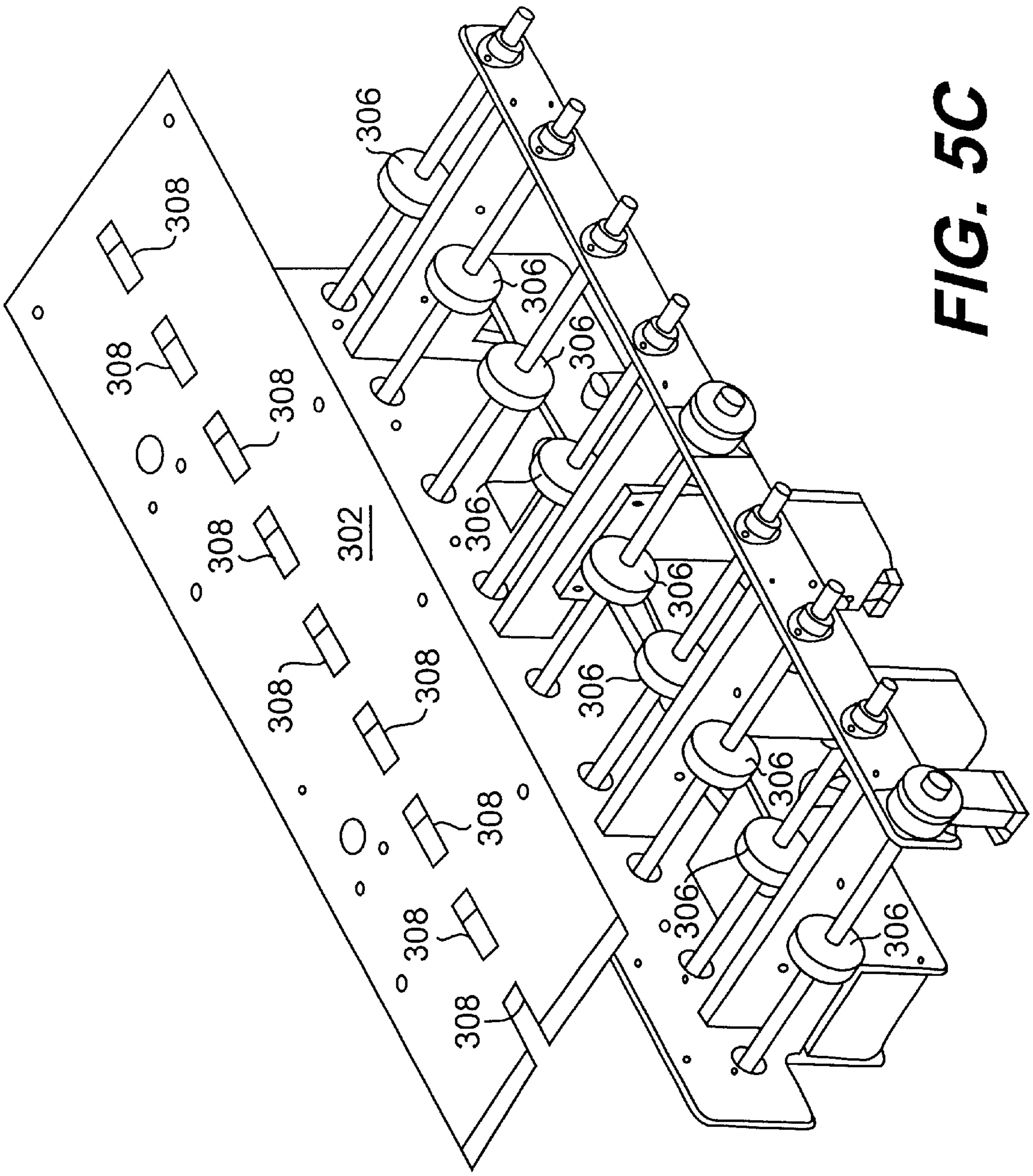
FIG. 5C is a substantially schematic exploded view of the alternative intermediate conveyor of FIG. 5B.

FIG. 5B depicts a preferred alterative intermediate conveyor 300 comprising a conveyor bed 302 and plurality of conveyors 304 positioned along the length thereof. Preferably, although not necessarily, a freely rotating roller 306 (best viewed in FIG. 5C) is positioned below each conveyor 304 to reduce the friction between the conveyor bed 302 and envelopes 4 traveling therealong. It is contemplated however, that each rollers 306 could alternatively be driven simultaneously with the corresponding conveyor 304. To allow each envelope 4 to travel as close to the conveyor bed 302 as possible, thereby preventing air from catching and lifting the envelope from the conveyor bed 302, each roller 306 protrudes only slightly through the conveyor bed 302 at a respective roller aperture 308. Envelopes 4 may, therefore, be quickly passed along the conveyor bed.

In operation, the conveyors 304 of the alternative intermediate conveyor 300 are selectively driven as distinct sets to create staging areas for the envelopes 4 traveling along the conveyor bed 302. That is, by driving the conveyors 304 as distinct sets, the advancement of envelopes 4 along the conveyor bed 302 may be selectively paused at each distinctly driven set of conveyors 304 to allow for timely delivery of each envelope 4. FIG. 5B depicts a first drive assembly 310 and a second drive assembly 312 to allow driving of the plurality of conveyors 304 in two distinct sets. To facilitate a control system capable of monitoring the position of envelopes 4 and/or the timely advancement of those envelopes 4 along the alternative intermediate conveyor 300, an envelope sensor 314 is associated with each distinctly driven set of conveyors 304.

Figure 6:
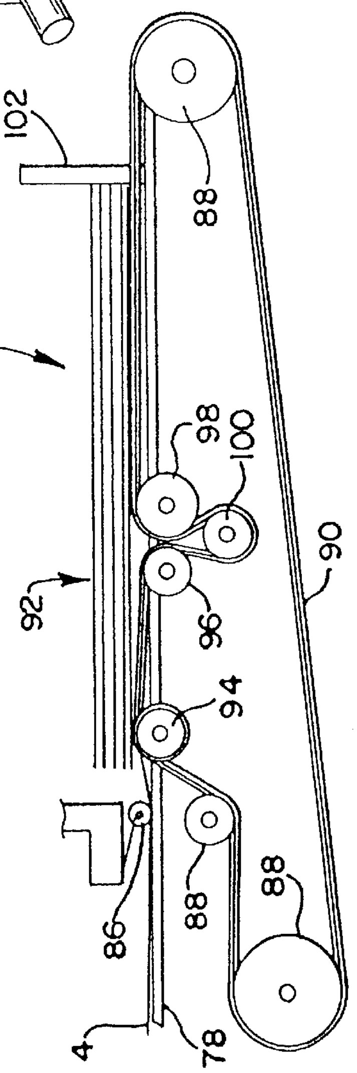
FIG. 6 is a substantially schematic cross-sectional view of the second bottom feeder.

The preferred configuration of the second bottom feeder 84 differs from that of the first bottom feeder 62. The preferred second bottom feeder 84 is depicted generally in FIGS. 5 and 6. It should be noted that although the preferred envelope packing apparatus 2 comprises first bottom feeder 62 and second bottom feeder 84 in the orientations described herein and depicted in FIG. 1, the configurations could be exchanged one for the other without substantially affecting the performance of the envelope packing assembly 104. In the same respect, first and second bottom feeder 62,84 could both be of the same configuration representing either that of the first or second bottom feeder 62,84.

Each envelope 4 traveling along the intermediate conveyor 78 flows into the second bottom feeder 84. The preferred second bottom feeder 84 comprises a tension roller 86 at the entrance thereto. Adjacent the tension roller 86 is positioned a plurality of rollers 88 and tensioned belts 90 which extends around the plurality of rollers 88 to propel each consecutive envelope 4 from the intermediate conveyor 78 to the bottom of the second buffer stack 92 of envelopes.

The plurality of rollers 88 comprises a first roller 94, a second roller 96, a third roller 98 and a fourth roller 100. First roller 94 is positioned adjacent to tension roller 86 at the entrance to the second bottom feeder 84. The first roller 94 is positioned above the level of the intermediate conveyor 78 such that upon reaching the tensioned belts 90 extending around the first roller 94, each envelope 4 will be raised upward forcing the leading edge of each envelope 4 to push upward the second buffer stack 92. Each envelope is then slide under the stack of envelopes 92 until it encounters the second bottom feeder stop 102. In this manner, each envelop entering the second bottom feeder 84 will be placed at the bottom of the second buffer stack 92.

The second, third and fourth rollers 96,98,100 of the plurality of rollers 88 are positioned underneath the second buffer stack 92 in a manner which allows for better stacking of envelopes having, what are traditionally called, windows therein. A window generally refers to a substantially rectangular portion cut out of the envelope and sometimes covered with a clear material, typically cellophane, such that portions of the contents of the envelope may be read without opening the envelope.

The accommodation of windowed envelopes is accomplished by adapting the second roller 96 such that its top is lower than the top of the first roller 94 and adapting the third roller 98 such that its top is at a higher level than the first roller 94. Preferably, the top of the third roller 98 is at approximately the same level as the top of the first roller 94. The fourth roller 100 is positioned below and between the second and third roller 96,98 such that tensioned belts 90 can be run over first roller 94, down to second roller 96, down and around fourth roller 100 and back up to third roller 98. Because the envelope buffer stack 92 rests on the tensioned belt 90 of the two highest rollers, first roller 94 and second roller 96, this configuration presents an gap between the tensioned belt 90 and the envelop buffer stack 92 from the first roller 94 to the third roller 98.

This gap allows for an air cushion between the buffer stack 92 and each envelope which is being inserted under the buffer stack 92 from the intermediate conveyor 78. This air cushion lessens the friction between the buffer stack 92 and the envelope 4 being inserted such that easier stacking within the second bottom feeder 84 is achieved. Lessening friction is of special concern when the envelopes employed in the envelope packing apparatus 104 have windows therein. The cellophane material, and others typically employed in said windows, create a higher friction between the envelopes than do envelopes without windows. Also, the envelopes 4 in the second buffer stack 92 are oriented such that the envelope front wall 12 is immediately adjacent the tensioned belt 90 of the second bottom feeder 84. Since envelope windows are typically placed on the front wall 12 of an envelope, the windows present envelope portions which may be caught and damaged by an incoming envelope in the instant second bottom feeder 84. Therefore, the air cushion allows an incoming envelope 4 to avoid getting caught in the envelope window of the envelope on the bottom of the second buffer stack 92. Consequently, this configuration of an bottom feeder is preferable when employing envelopes with windows.

The second, third and fourth rollers 96,98,100 are preferably configured as a sub-assembly of the second bottom feeder 84 such that they may be moved closer to or further from the first roller 94. In this manner, the gap between the tensioned belt 90 and the bottom envelope of the envelope buffer stack 92 may be lengthened or shortened to accommodate varying placement or length of the window employed by the envelopes which are being used in the envelope packing apparatus 2. It is to be understood that other known configurations of stackers could be employed with the instant envelope packing apparatus 2 without substantially affecting the benefits derived from the other inventive aspects of the instant invention.

Referring generally to FIGS. 7A–7D, the envelope packing assembly 104 of the instant invention comprises a packing prompter 106 for urging each consecutive envelope from the top of the second buffer stack 92 toward a threading means 108 and a packing plate 110. In operation, packing prompter 106 removes each consecutive uppermost envelope from the second buffer stack 92 and urges it toward the threading means 108.

The second buffer stack 92 is adapted to hold a plurality of envelopes 4 in the flap-opened position for further processing by the packing assembly 104. In operation, the second buffer stack 92 preferably accumulates a plurality of envelopes at start-up of the instant apparatus and maintains a plurality therein during operation of the apparatus in the same manner as the first bottom feeder 62 such that the packing prompter 106 may draw from the second buffer stack 92 as it needs envelopes.

The envelope packing apparatus 2 of the instant invention is configured such that the packing prompter 106 will first engage the flap 8 of each consecutive uppermost envelope of the second buffer stack 92 and draw that opened flap 3 as the leading edge of the envelope into the packing assembly 104. In this orientation, the packing prompter 106 will release the envelope by urging the trailing edge, comprising the envelope bottom 18, along a bridge conveyor 138 toward the threading means 108. Consequently, the envelope flap 8 will be the first portion of the envelope to contact the threading means 108 and the envelope opening 16 will follow. Therefore, when the envelope 4 is urged toward the packing plate 110 by the threading means 108, the packing plate 110 will encounter the envelope opening 16.

In the preferred embodiment, packing prompter 106 comprises a first and second roller 112,114. First roller 112 rests atop the second buffer stack 92 to provide the initial force to each envelope 4. The second roller 114 then guides the displaced envelope to the bridge conveyor 138. Bridge conveyor 138 preferably comprises two rollers with a belt configured therearound such that envelopes leaving the packing prompter 106 are guided onto threading roller 108. However, any means of achieving proper delivery from the packing prompter 106 to the threading means 108 is contemplated.

The threading means 108 is adapted to raise the flap 8 of each consecutive envelope 4 into an alignment with the packing plate 110 as that flap 8 is placed on the threading roller 108 by the bridge conveyor 138. Threading means 108 is preferably a driven roller mounted adjacent the bridge conveyor 138 to accept envelopes 4 delivered therefrom and then deliver those envelopes to the packing plate 110. In a preferred operation threading is accomplished by the threading means 108 with the flap 8 of each consecutive envelope 4 being raised upward to be positioned adjacent the packing plate 110 such that mounting of the envelope 4 on the packing plate 110 may then be accomplished by continued urging of the envelope 4 toward the packing plate 110. Threading means 108 is therefore provided with rotation to impart said continued urging.

Figure 7C:
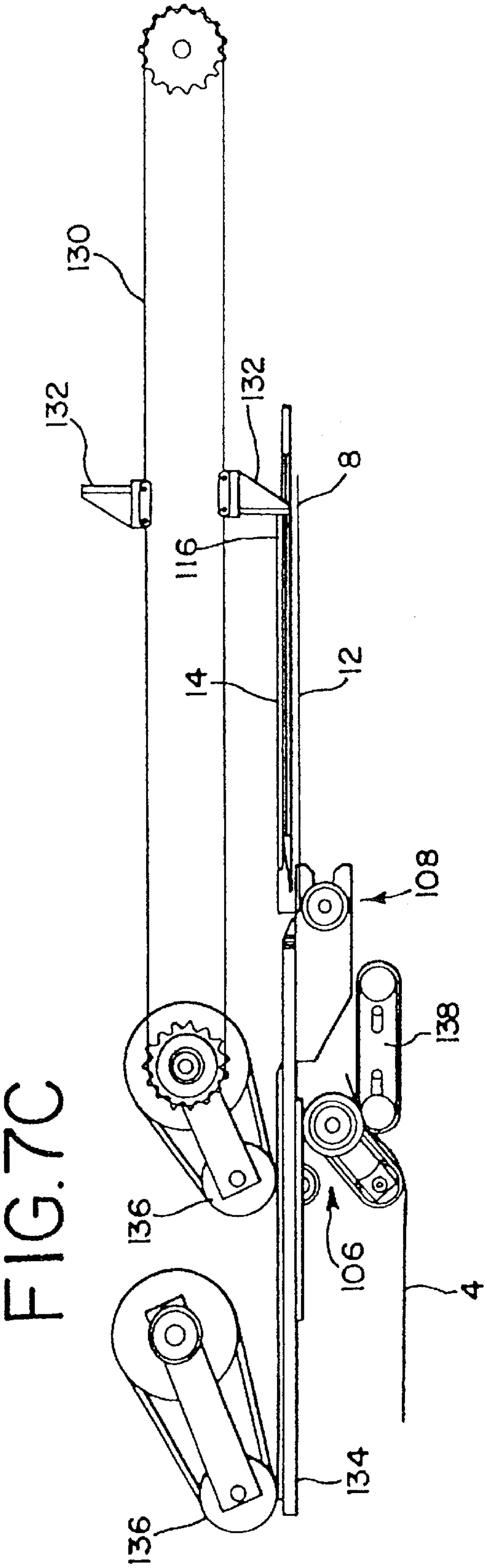
FIG. 7C is a substantially schematic cross-sectional view of the envelope packing assembly with an envelope being placed on the packing plate by the threading conveyor.
Figure 8:
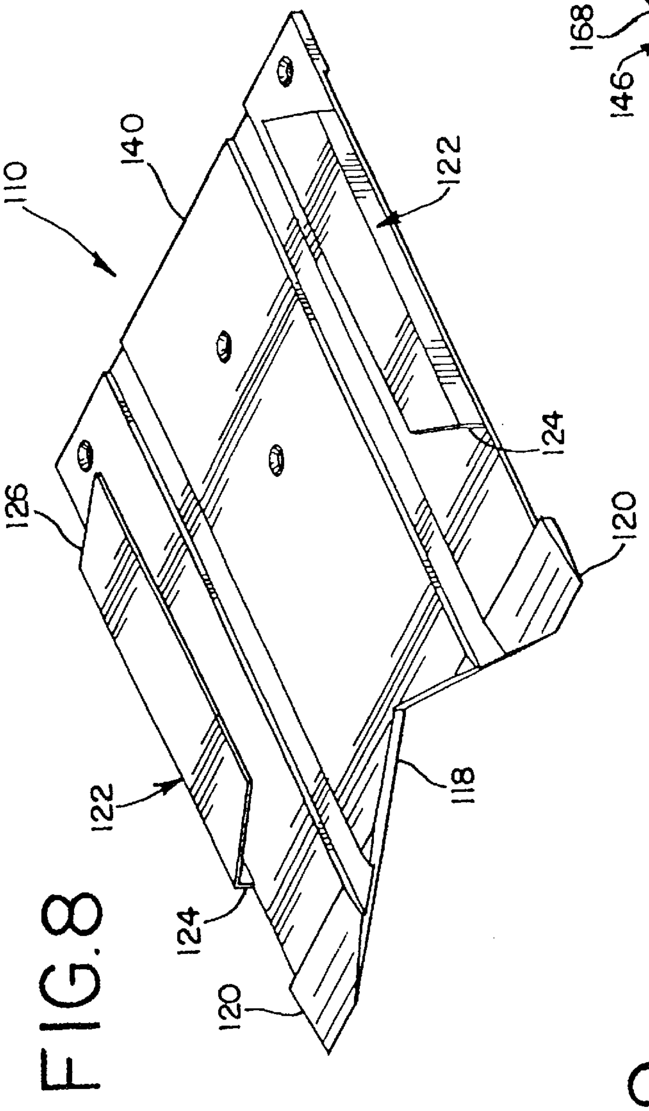
FIG. 8 is a substantially schematic perspective view of the packing plate.

The preferred packing plate 110, shown in FIG. 8, is configured to separate envelope front wall 12 from envelope back wall 14 at the envelope opening 16 upon the envelope 4 being slid onto the packing plate 110. This is accomplished as described above by means of the rotating threading means 108 which raises each envelope to the packing plate 110 and forces it thereon. Consequently, in operation, the urging of an envelope 4 aligned with the packing plate 110 by the threading means 108 would separate the envelope front wall 12 from the envelope back wall 14 and thereby open the body 6 of the envelope 4 as depicted in FIG. 7C. In this manner, each consecutive envelope 4 entering the envelope packing assembly 104 may be opened and slide over the packing plate 110.

The packing plate 110 is further configured to part the envelope front wall 12 from the envelope back wall 4 in a manner allowing a packing material 116 to be slide along the packing plate 110 and into opened envelope body 6. In the preferred embodiment, packing plate 110 comprises a front edge 118 having a spreader 120 positioned at each side thereof. The spreaders 120 present a narrow leading edge for the each envelope to first encounter and then get thicker toward an end distal from the front edge 118 of the packing plate 110. A spacer 122 is positioned adjacent each spreader 120 and runs along each side of the packing plate 110. Each spacer presents a vertical portion 124 from which an overhang portion 126 extends over the packing plate 110. In this configuration, the packing plate 110 will hold open an envelope 4 such that packing may slid along the packing plate and into an awaiting envelope 4 without resistance from the envelope 4. It is important that neither the spreaders 120 nor the spacers 122 inhibit the movement of the packing material 116 through the packing plate 110 and off of the packing plate 110 at the front edge 118 thereof. The front edge of the packing plate 110 is also preferably angled inward from each side toward the back edge 140 of the packing plate 110. This results in the V-shaped cut out of the first edge 118 and allows envelopes which employ windows therein to be placed on the packing plate without the window encountering the first edge 118 of the packing plate 110. This configuration therefore allows packing of windowed envelopes.without risk of the window being damaged by the packing plate 110. It is of significance to note that because each envelope 4 is lifted onto the packing plate 110 by the threading means 108 the packing plate 110 may, and preferably does, remain stationary throughout the packing process.

The packing of the packing material 116 into each consecutive envelope 4 on the packing plate 110 is accomplished by a packing material conveyor 128 comprising belt 130 and picks 132. The belt 130 is a continuous belt with the picks 132 located thereon. The picks 132 remove each consecutive packing material 116 from a packing material reserve (not shown), slide that packing material 116 along the packing plate 110 and into an awaiting envelope on the packing plate 110.

In addition to facilitating the insertion of the packing material 116 into each consecutive envelope 4, the packing material conveyor 128 preferably serves an additional function of removing each consecutive envelope 4 from the packing plate 110 to an exiting platform 134 positioned laterally adjacent to the packing plate 110. This is accomplished by extending the packing material conveyor 128 past the packing plate 110 and to a point on the exiting platform 134. In this manner, the force exerted by the packing material conveyor 128 onto the packing material 116 will be transferred to the respective envelope 4 on the packing plate 110 when the packing material 116 encounters an envelope bottom 18 of the respective envelope 4 and that envelope 4 will then be propelled onto the exiting platform 134.

Figure 7A:
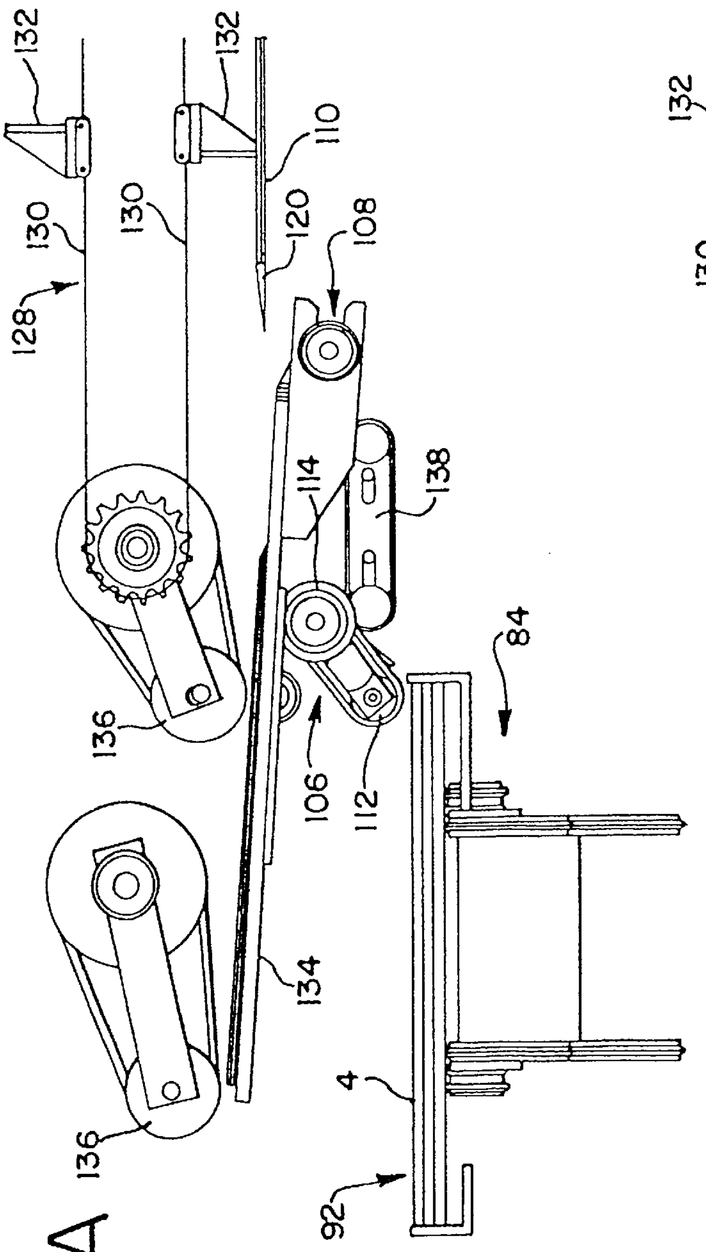
FIG. 7A is a substantially schematic cross-sectional view of the envelope packing assembly and the second bottom feeder.
Figure 7B:
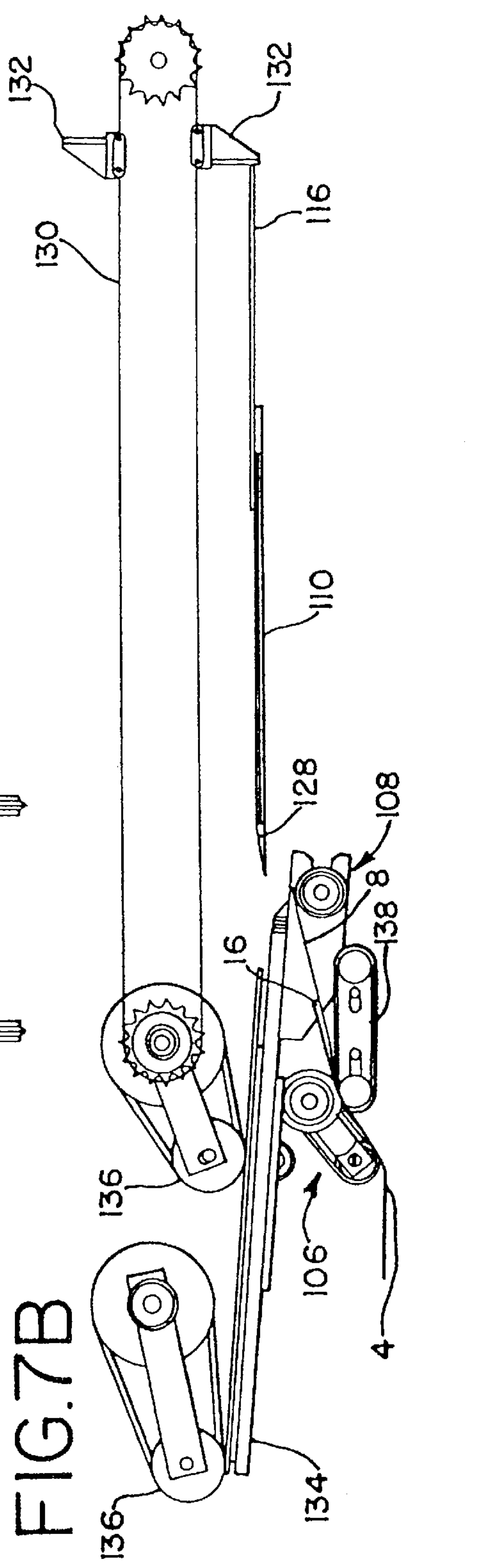
FIG. 7B is a substantially schematic cross-sectional view of the envelope packing assembly with an envelope loaded on the threading conveyor.
Figure 7D:
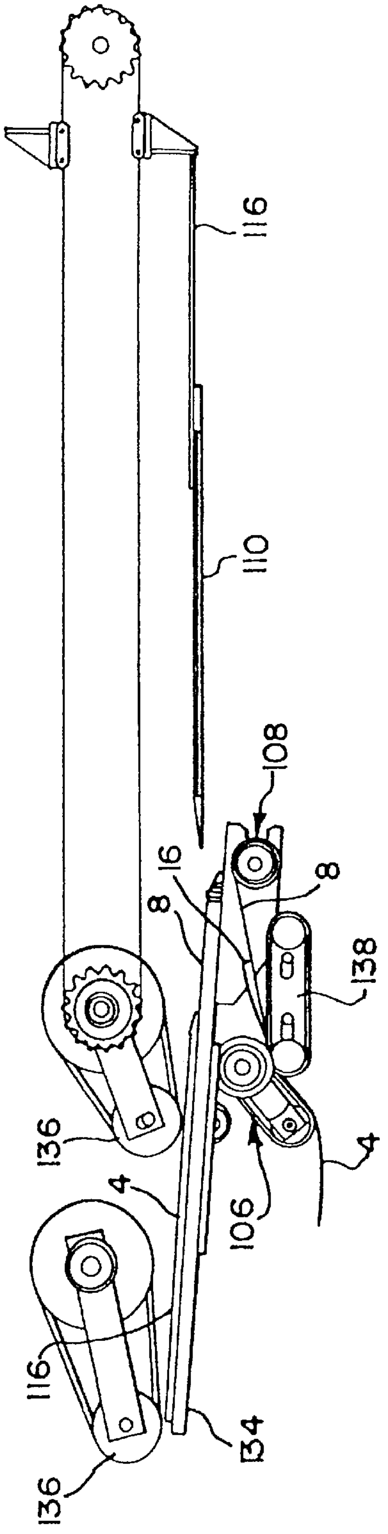
FIG. 7D is a substantially schematic cross-sectional view of the envelope packing assembly with a packed envelope exiting the packing assembly and a new envelope being placed on the threading conveyor.

The advantages of the instant packing assembly 104 are best understood by reference to its operation and by reference to a depiction thereof in each of FIGS. 7B–7D representing the procession of an envelope through the instant envelope packing assembly 104. The threading means 108 is attached to the lower edge of the exiting platform 134 at an end nearest the packing plate 110. The preferred embodiment of the instant packing assembly 104 employs an exiting platform 134 which rotates from a loading position depicted in FIG. 7B to a threading position depicted in FIG. 7C. Furthermore, as will be discussed below, the loading position also serves as an exiting position for loaded envelopes to be removed from the packing plate 110 as the next consecutive envelope is being loaded onto the threading means 108.

FIG. 7B depicts an envelope 4 which has been drawn from the second buffer stack 92 by packing prompter 106 and across the conveyor bridge 138 to be loaded onto threading roller 108. It should be noted that the exiting platform 134 is in the loading position at this time. That position is represented by the exiting platform 134 being lowered toward the bridge conveyor 138. This loaded position allows for empty envelopes to be loaded onto the threading means 108 by packing prompter 106 and bridge conveyor 138.

Once the flap 8 of an envelope has been loaded onto the threading roller 108 as depicted in FIG. 7B, the exiting platform 134, and therefore the threading means 108, shifts upward to the threading position depicted in FIG. 7C. The threading position of the exiting platform 134 positions the envelope flap 8 against a lower side of the packing plate 110 at a position adjacent to the packing plate first edge 118 and threading means 108 presses the envelope flap 8 against said lower side such that the continued urging of the threading means 108 will direct the envelope loaded on the threading means 108 over the front edge 118 of the packing plate 110 and packing plate spreaders 120 will separate the envelope front wall 12 from the envelope back wall 14 at the envelope opening 16. To insure that the envelope 4 will slide along the packing plate 110, the threading roller is comprised of a material, preferably an elastomer, which has a higher coefficient of friction with respect to the envelopes than does the packing plate 110. This accomplishes a mounting of the envelope on the packing plate 110 with the envelope front 12 and envelope back 14 spread to accept packing material 116.

As the envelope is being loaded onto the packing plate 110, the packing picks 132 of the packing material conveyor 128 slide the packing material 116 along the packing plate 110, under the spacer overhang portion 126 and to the back of the envelope. Preferably, the packing material conveyor 128 accelerates the packing material 116 upon contacting it and then decelerates as it reaches the envelope. The acceleration and deceleration of the packing material conveyor 128 would represent a sinusoidal wave form as viewed graphically. Just as the envelope is fully loaded onto the packing plate 110, the packing material 116 will reach the end of the packing plate 110 and therefore the back of the envelope mounted thereon. The fully loaded position need not, and preferably does not, comprise the envelope bottom 18 engaging the packing plate first edge 118. Rather, quicker packing may be accomplished by having packing material 116 engage the envelope bottom 18 prior to said envelope bottom 18 reaching the packing plate first edge 118. The continued motion by the packing picks 132 will remove the packed envelope from the packing plate 110 and onto the exiting platform 134. Once on the exiting platform 134, the packed envelope is pushed off the back of exiting platform 134 by exiting platform conveyors 136 to the exiting conveyors 142. It is important to note that unlike prior art assemblies, the packing picks 132 redirection of the envelope 4 from moving onto the packing plate 110 to moving off the packing plate 110 is the only instance of the instant envelope packing apparatus 2 reversing the momentum of an envelope 4. A more efficient apparatus is thereby accomplished.

Prior to the envelope being slid off of the packing plate 110 by the picks 132, the exiting platform 134 is lowered back to the loading position, depicted in FIG. 7D, such that the envelope on the packing plate 110 may be ejected onto the exiting platform 134. While the packed envelope is being removed to the exiting platform 134 the packing prompter 106 loads another envelope onto the threading means 108 from the second buffer stack 92. The process depicted in FIGS. 7B–7D is then continuously repeated.

Each packed envelope is consecutively removed from the exiting platform 134 by the exiting platform conveyors 136 to the exiting conveyor 142 depicted generally in FIGS. 7A–7D. Each envelope leaving the exiting platform 134 falls into a transfer unit 144 (depicted generally in FIG. 9) which then ejects the envelope 4 to a stand-up subassembly 146 which orients the envelope to a vertical position. The envelope flap 8 is then wetted by a reservoir 148 and forced downward against the envelope body 6 by a lick and seal subassembly 150 to accomplish sealing of the envelope.

Figure 10A:
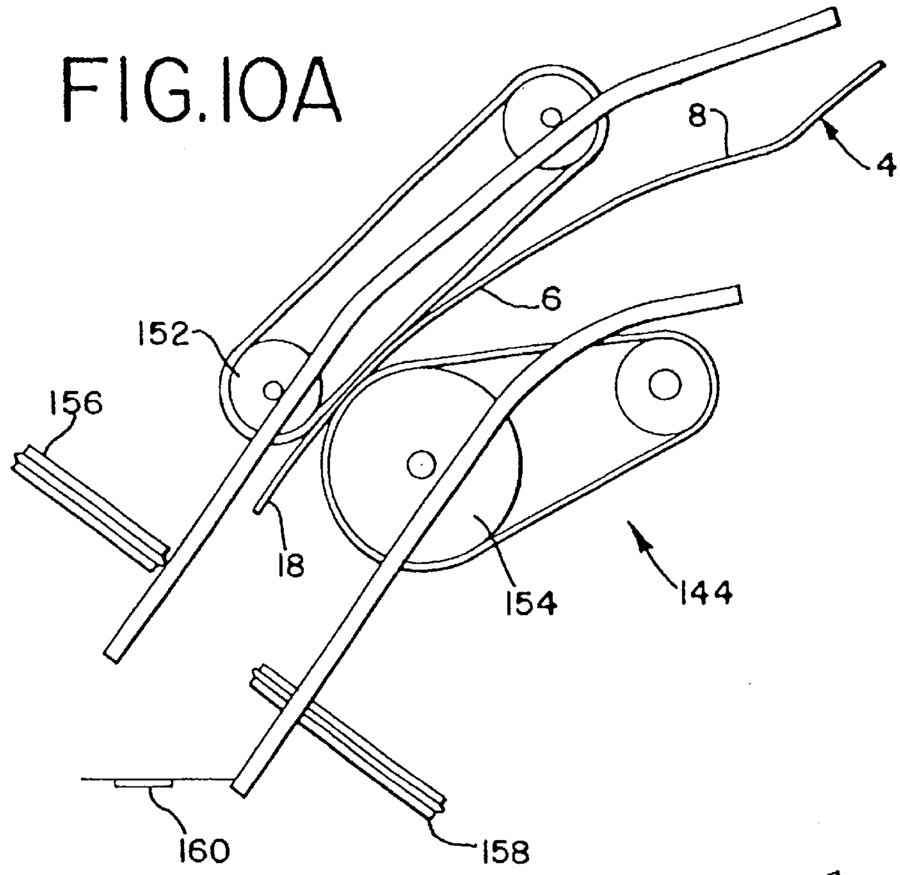
FIG. 10A is a substantially schematic cross-sectional view of the transfer unit of the exiting conveyor accepting an envelope.
Figure 10B:
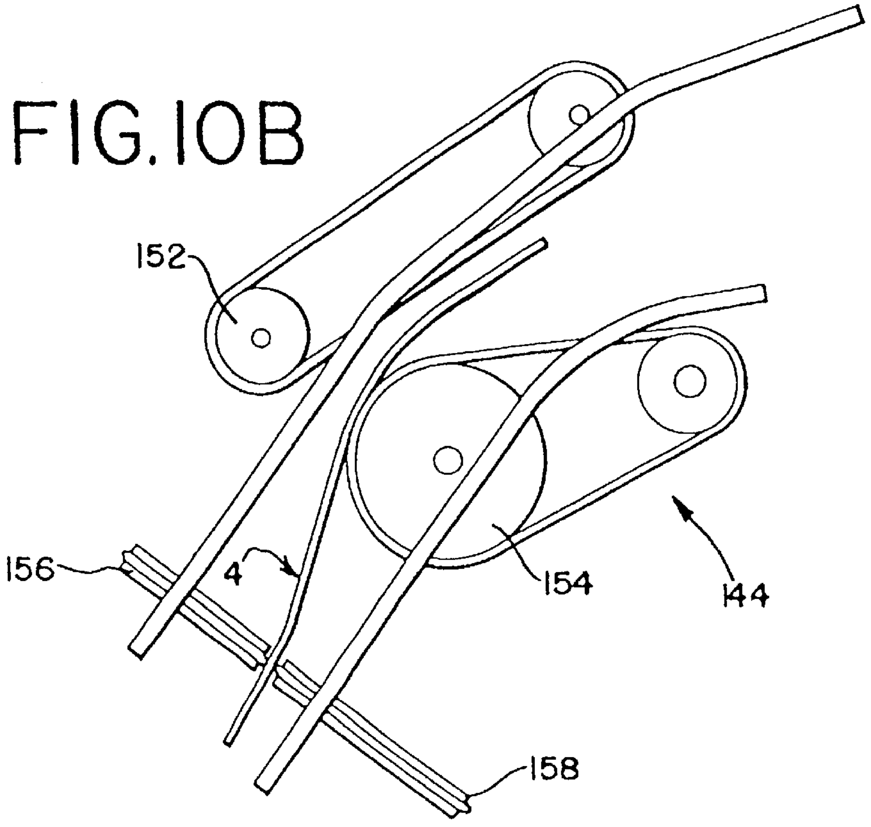
FIG. 10B is a substantially schematic cross-sectional view of the transfer unit of the exiting conveyor ejecting an envelope to the sealing assembly.

The transfer unit 144 is depicted in FIGS. 10A and 10B. FIG. 10A depicts the transfer unit 144 with an envelope 4 positioned therein. Transfer unit 144 comprises a first and second seating conveyor 152,154 which are driven to draw in envelopes 4 deposited therein from above by the packing assembly 104 and seat those envelopes 4 in the transfer unit 144. Transfer unit 144 further comprises a first and second ejection conveyor 156,158 which are driven to eject envelopes 4 from the transfer unit 144 to the stand-up subassembly 146. Ejection conveyors 156,158 are located below the first and second seating conveyors 152,154. Ejection conveyors 156,158 are further positioned at a distance from one another while the seating conveyors are seating an envelope 4 therein to avoid impeding the seating of said envelope 4.

Figure 11A:
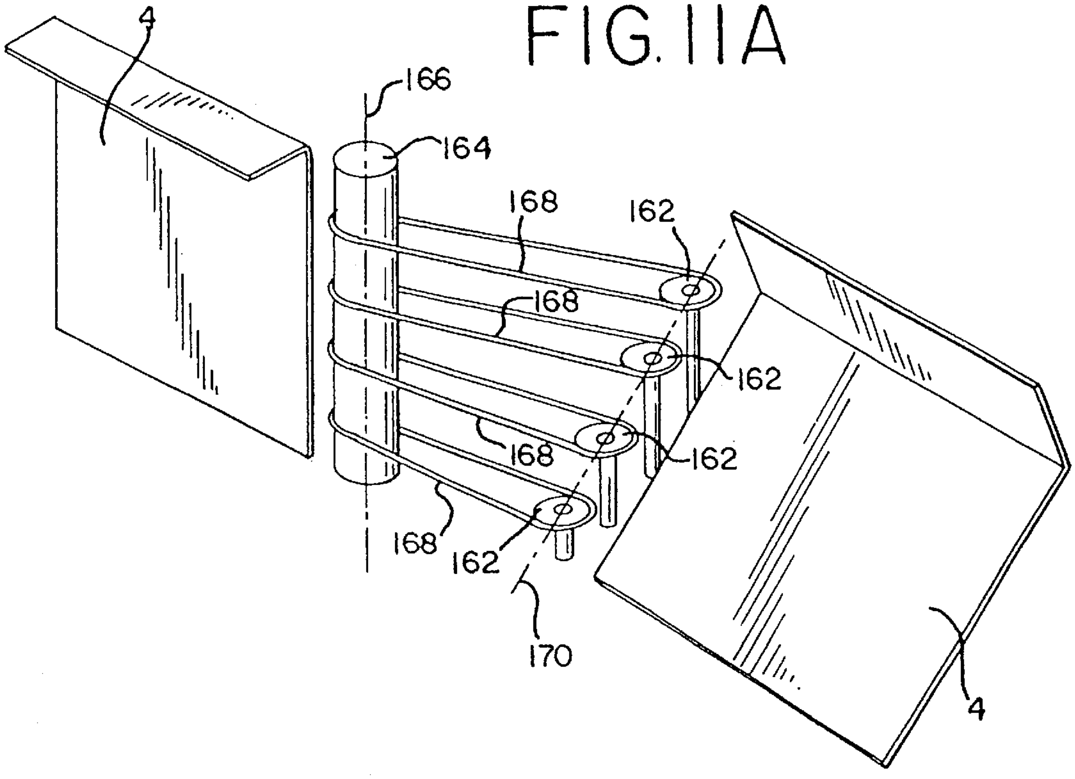
FIG. 11A is a substantially schematic perspective view of the envelope stand-up subassembly of the sealing assembly.

When envelope 4 contacts the seated position in the transfer unit 144, a sensor 160 signals the first seating conveyor 152 to retract and signals the first ejection conveyor 156 to shift toward the second ejection conveyor 158 such that the seated envelope 4 is gripped between the first and second ejection conveyors 156,158 as depicted in FIG. 10B. Once the ejection conveyors 156,158 have a grip on the envelope 4, their rotation ejects said envelope 4 out of the transfer unit to the stand-up subassembly 146 depicted generally in FIG. 11A.

The stand-up subassembly 146 comprises a plurality of pulleys 162 adjacent the exit of the transfer unit. The pulleys 162 are staggered at increasing heights. Adjacent the sealing subassembly is positioned a vertical roller 164 having a vertical axis of rotation 166. A separate belt 168 is placed around each pulley of the plurality of pulleys 162 and the vertical roller 164 such that a plurality of belts 168 extend from the exit of the transfer unit 144 to the sealing subassembly 150 at varying heights. A wall of belts is thereby created between the transfer unit 144 and the sealing subassembly 150.

As well as being staggered in height, the plurality of pulleys 162 are spread out along a line positioned perpendicular to the axis of rotation of the vertical roller 166. With the spreading out of the pulleys 162 in this manner, the pulleys 162 are aligned in a straight line represented by line 170. The placement of the pulleys 162 as describer above contorts the wall of belts between the pulleys 162 and the vertical roller 166. Therefore, the pulleys 162 are positioned adjacent to the exit of the transfer unit 144 and the line 170 of pulleys 162 is conformed to the angle at which the envelopes 4 leave the transfer unit 144. In this configuration, each envelope 4 leaving the transfer unit 144 will be cradled by the belts 168. By imparting continuous rotation to the-.belts 168 by driving either the pulleys 162 or the vertical roller 164, the belts direct the envelopes 4 from the transfer unit 144 to the sealing, subassembly 150. The contorted wall of belts 168 also elevates the envelope from its angled orientation at the pulleys 162 to the vertical orientation dictated by the vertical roller 164. A second preferred embodiment of the stand-up subassembly 146 resembles the first as described above except that alignment line 170 represents the axis of rotation of a second roller and the plurality of belts 168 are replaced by a single belt which extends the length of the roller.

It is important to note that because the envelope bottom 18 represented the leading edge of the envelope 4 as it was removed from the packing plate 110 and subsequently the exiting platform 134, said envelope 4 lands with the bottom 18 at the bottom of the transfer unit 144. Therefore, when the envelope 4 is elevated to a vertical position by the stand-up subassembly 146, the flap 8 of said envelope 4 was at the uppermost portion thereof.

Figure 9:
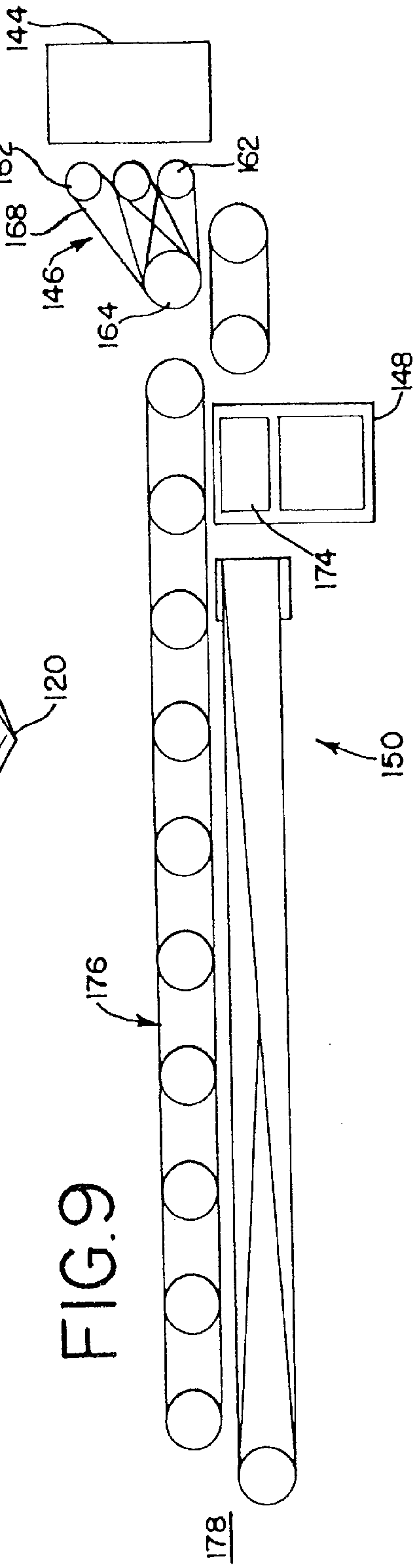
FIG. 9 is a substantially schematic top view of the exiting conveyor.
Figure 11B:
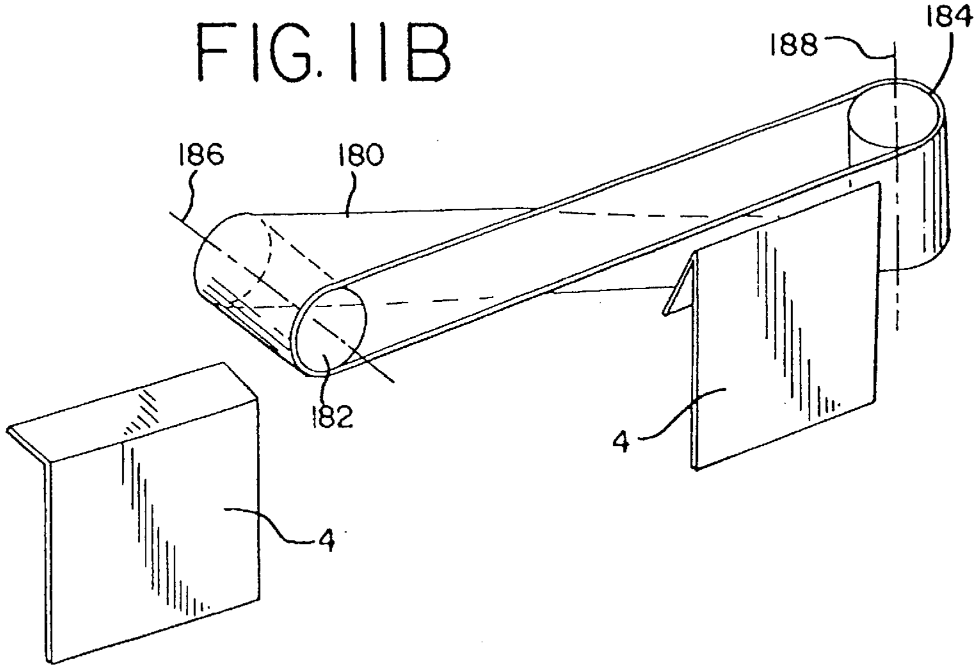
FIG. 11B is a substantially schematic perspective view of the envelope lick and seal subassembly of the sealing assembly.

The sealing subassembly 150 is depicted in FIGS. 9 and 11B. As each envelope 4 enters the sealing subassembly 150 the vertical orientation of the envelope 4 should cause the envelope flap 8 to fall to approximately a horizontal position. However, if the stiffness of the envelopes employed in the envelope packing apparatus 2 is such that the flaps 8 do not fall to a horizontal position upon being elevated to a horizontal position, or of a stiffness such that the flap 8 falls beyond the horizontal position, a flap rotating assembly 172 may be placed at the entrance to the sealing subassembly such that the flap 8 is rotated to a horizontal position such that it is perpendicular to the envelope body 6.

Once a horizontal flap 8 is achieved, the envelope is passed into the reservoir 148 where the horizontal flap 8 of the envelope 4 is run over a bead of water to moisten the adhesive on the flap 8 of said envelope 4. The reservoir is a pressurized water reserve which is placed under an appropriate pressure to form a continuous bead of water at the top thereof. The motion of envelope 4 is imparted by a sealing conveyor 176 which directs each envelope 4 from the transfer unit 144 to the exit 178 of the envelope packing apparatus 2.

The moistened flap 8 is then directed to a sealing belt 180. The sealing belt 180 is a wide belt which presents a wall to the flap 8. Sealing belt 180 is run around a first and second sealing belt roller 182, 184 which impart rotation to said belt 180. The axis of rotation 186 of the first sealing belt roller 182 is positioned horizontally such that the wall presented by the sealing belt 180 will conform with the horizontal position of the flap 8 as the envelope 4 encounters the sealing belt 180. However, the axis of rotation 188 of the second sealing belt roller 184 is positioned vertically such that the wall which the flap 8 encounters gradually adjusts from horizontal to vertical between the first and second sealing belt rollers 182,184. As a result, the flap 8 of any envelope 4 which encounters the sealing belt will be directed downward and into contact with the envelope body 6. Upon said contact, the moistened adhesive on the flap 8 will bond the flap 8 to the body 6 and accomplish a sealed envelope. Upon accomplishing a sealed envelope, the sealing conveyor continues direction of the envelope 4 to the exit 178 of the envelope packing apparatus 2. Any means of collecting or collating the sealed envelopes is contemplated.

The foregoing specification describes only the preferred embodiment of the invention as shown. Other embodiments besides those presented above may be articulated as well. The terms and expressions therefore serve only to describe the invention by example only and not to limit the invention. It is expected that others will perceive differences which while differing from the foregoing, do not depart from the spirit and scope of the invention herein described and claimed.

We claim:

1. A staging assembly for an object having a leading edge, said staging assembly comprising:

an intake conveyor for receiving and conveying said object in a first direction and into a staging area;

a stop plate for contacting said leading edge of said object conveyed by said intake conveyor and aligning said object in said staging area;

a first ejection roller mounted in said staging area underneath said object in said staging area;

a second ejection roller mounted on a plunger device in said staging area above said object in said staging area, and aligned with said first ejection roller, said second ejection roller being selectively positionable into and out of contact with said object in said staging area via said plunger device, wherein said object is conveyed in a second direction out of said staging area when said second ejection roller is moved into contact with said object, in cooperation with said first ejection roller; and a clearing conveyor for receiving and conveying said object in said second direction and out of said staging assembly.

2. The staging assembly of claim 1, further comprising a housing defined by at least a first sidewall and a second sidewall, said intake conveyor, said stop plate, said first ejection roller, said second ejection roller, and said clearing conveyor all being mounted in said housing.

3. The staging assembly of claim 1, wherein said first ejection roller and said second ejection roller are positioned to contact said object proximate the center thereof, when said object is in said staging area, and aligned by said stop plate.

4. The staging assembly of claim 1, wherein said object, when in said staging area, and aligned by said stop plate, is free and clear of said intake conveyor and said clearing conveyor.

5. The staging assembly of claim 1, further comprising sensor means for operatively triggering said plunger.

6. A method for staging an object having a leading edge, said method comprising the steps of:

conveying said object in a first direction and into a staging area via an intake conveyor;

providing a stop plate for contacting said leading edge of said object conveyed by said intake conveyor and aligning said object in said staging area;

mounting a first ejection roller in said staging area underneath said object in said staging area;

mounting a second ejection roller on a plunger device in said staging area above said object in said staging area, and aligning with said first ejection roller;

selectively positioning said second ejection roller into and out of contact with said object in said staging area via said plunger device;

conveying said object in a second direction out of said staging area when said second ejection roller is moved into contact with said object, in cooperation with said first ejection roller; and conveying said object in said second direction and out of said staging assembly via a clearing conveyor.

* * * * *

UNITED STATES PATENT AND TRADEMARK OFFICE

CERTIFICATE OF CORRECTION

PATENT NO. : 6,264,021 B1
DATED : July 24, 2001
INVENTOR(S) : Button et al.

It is certified that error appears in the above-identified patent and that said Letters Patent is hereby corrected as shown below:

Column 2,
Line 3b, delete "1863" and insert -- '863 -- to read " '863 patent";

Column 7,
Line 58, delete "39" and insert -- 3B -- to read "FIGS. 3A and 3B";

Column 17,
Lines 30-31, "envelopes.without" should read -- envelopes without --; and Column 20,
Lines 2-3, "the.belts" should read -- the belts --.

Signed and Sealed this

Thirtieth Day of April, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 6,264,021 B1
APPLICATION NO. : 09/368940
DATED : July 24, 2001
INVENTOR(S) : Kevin Button et al.

It is certified that error appears in the above-identified patent and that said Letters Patent is hereby corrected as shown below:

On the Title Page, under item (22), after Related U.S. Application Data, insert the paragraph to read:

--(60) Division of Application No. 09/108,655, filed on July 1, 1998, now Patent No. 6,199,348 which is a Continuation-in-Part of Application No. 08/734,632, filed on October 21, 1996, now Patent No. 5,809,749.--

Signed and Sealed this
Twenty-fourth Day of January, 2012

David J. Kappos
*Director of the United States Patent and Trademark Office*